United States Patent
Lin et al.

(10) Patent No.: US 8,527,664 B2
(45) Date of Patent: Sep. 3, 2013

(54) DIRECT MEMORY ACCESS WITH MINIMAL HOST INTERRUPTION

(75) Inventors: Douglas N. Lin, Orange, CT (US);
Thomas D. Moore, Raleigh, NC (US);
Bruce H. Ratcliff, Red Hook, NY (US);
Jerry W. Stevens, Raleigh, NC (US);
Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 12/640,832

(22) Filed: Dec. 17, 2009

(65) Prior Publication Data
US 2011/0153771 A1 Jun. 23, 2011

(51) Int. Cl.
*G06F 15/16* (2006.01)

(52) U.S. Cl.
USPC .......... 709/250; 709/212; 710/22; 710/59; 710/60

(58) Field of Classification Search
USPC ............... 709/250, 212; 711/112; 710/22, 710/58–60
See application file for complete search history.

(56) References Cited

U.S. PATENT DOCUMENTS

| | | | | |
|---|---|---|---|---|
| 5,764,896 A * | 6/1998 | Johnson | | 709/250 |
| 5,905,874 A * | 5/1999 | Johnson | | 709/250 |
| 5,937,169 A * | 8/1999 | Connery et al. | | 709/250 |
| 6,332,171 B1 | 12/2001 | Baskey et al. | | |
| 7,089,457 B2 | 8/2006 | Stevens | | |
| 7,245,627 B2 * | 7/2007 | Goldenberg et al. | | 370/419 |
| 7,451,263 B2 * | 11/2008 | Oh et al. | | 711/103 |
| 8,102,769 B1 * | 1/2012 | Pearson et al. | | 370/235 |
| 2003/0112805 A1 * | 6/2003 | Stanton | | 370/395.1 |
| 2004/0013117 A1 * | 1/2004 | Hendel et al. | | 370/394 |
| 2004/0015966 A1 * | 1/2004 | MacChiano et al. | | 718/1 |
| 2005/0021680 A1 * | 1/2005 | Ekis et al. | | 709/219 |
| 2005/0102682 A1 * | 5/2005 | Shah et al. | | 719/321 |
| 2005/0141506 A1 * | 6/2005 | Aiken et al. | | 370/392 |
| 2005/0268137 A1 * | 12/2005 | Pettey | | 713/400 |
| 2006/0015618 A1 * | 1/2006 | Freimuth et al. | | 709/226 |
| 2006/0031524 A1 * | 2/2006 | Freimuth et al. | | 709/227 |
| 2006/0168400 A1 * | 7/2006 | Ronciak et al. | | 711/118 |
| 2008/0005258 A1 * | 1/2008 | Sridharan et al. | | 709/212 |
| 2008/0295098 A1 * | 11/2008 | Cardona et al. | | 718/101 |
| 2009/0024714 A1 * | 1/2009 | Raisch et al. | | 709/212 |
| 2009/0092057 A1 * | 4/2009 | Doctor et al. | | 370/252 |
| 2009/0222564 A1 * | 9/2009 | Freimuth et al. | | 709/228 |
| 2009/0239483 A1 * | 9/2009 | Rofougaran | | 455/90.2 |
| 2010/0088708 A1 * | 4/2010 | Macchiano et al. | | 719/313 |
| 2010/0121995 A1 * | 5/2010 | Fan et al. | | 710/56 |
| 2011/0296195 A1 * | 12/2011 | Nakagawa et al. | | 713/189 |

OTHER PUBLICATIONS

"Data Isolation in Shared Resource Environments," U.S. Appl. No. 12/246,718, filed Oct. 7, 2008.

* cited by examiner

*Primary Examiner* — Oanh Duong
(74) *Attorney, Agent, or Firm* — Steven Chiu, Esq.; Blanche E. Schiller, Esq.; Heslin Rothenberg Farley & Mesiti P.C.

(57) ABSTRACT

Data received over a shared network interface is directly placed by the shared network interface in a designated memory area of a host. In providing this direct memory access, the incoming data packets are split, such that the headers are separated from the data. The headers are placed in a designated area of a memory buffer of the host. Additionally, the data is stored in contiguous locations within the buffer. This receive and store is performed without interruption to the host. Then, at a defined time, the host is interrupted to indicate the receipt and direct storage of the data.

20 Claims, 22 Drawing Sheets

DIRECT MEMORY ACCESS WITH MINIMAL HOST INTERRUPTION

BACKGROUND

This invention relates, in general, to shared resource environments, and in particular, to facilitating the transfer of data into host memory within a shared resource environment.

A shared resource environment enables workloads executing within the environment, even those of different customers, to be consolidated on one machine allowing the resources of that machine to be shared.

One example of a shared resource is a shared network interface (e.g., a shared adapter), which facilitates communications with one or more hosts coupled to the shared network interface. The shared network interface facilitates the transfer of data, including large amounts of data, into or out of a host and the host's file system. It also facilitates the streaming of other types of large data, such as video or complex engineering or scientific graphics.

Transferring large amounts of data, whether it be files, streams, or other data, can be very expensive in terms of central processing unit (CPU) cycles and the cost of the network input/output (I/O).

BRIEF SUMMARY

Although some measures have been taken to address the inefficiencies of transferring large amounts of data to host memory, including providing more efficient adapters, further measures still need to be taken. Thus, to improve the transfer and store of large amounts of data, certain functions, such as inbound data receive functions, are offloaded from the host to the shared network interface. This provides a savings in terms of CPU cycles and the cost of network I/O.

The shortcomings of the prior art are overcome and additional advantages are provided through the provision of a computer program product for managing incoming data of a computing environment. The computer program product comprises a computer readable storage medium readable by a processing circuit and storing instructions for execution by the processing circuit for performing a method. The method includes, for instance, receiving, by a shared network interface of a computing environment, data to be provided to a host of the computing environment; determining, in response to receiving the data, whether receive processing associated with the data is to be performed by the shared network interface or by the host; and performing the receive processing by the shared network interface, in response to the determining indicating that the shared network interface is to perform the receive processing, wherein the host is relieved of performing the receive processing.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, data received over a shared network interface (e.g., an Open Systems Adapter (OSA)) is directly placed by the shared network interface into a host processor's designated memory area, offloading this function from the host processor. The designated memory area can be either in kernel or application space, and only a single interrupt to the host is performed, in response to arrival of a requested amount (e.g., large amount) of data. The specific amount of data can be specified by the application via, for instance, an API socket option, or dynamically derived by the host stack, in response to detecting streaming, as an example.

In one example, to provide the direct memory access between the host operating system and the shared network interface, the incoming data packets are split so that the protocol and transport headers are separated from the data. The split data is packed contiguously in a user application buffer to allow for the reception of large data segments needed for certain applications. The data is presented in the proper order to the host operating system protocol stack (e.g., TCP). The host operating system protocol stack is provided a capability to associate the received data with the proper split protocol and transport headers in order to properly process the incoming data.

Figure 1:
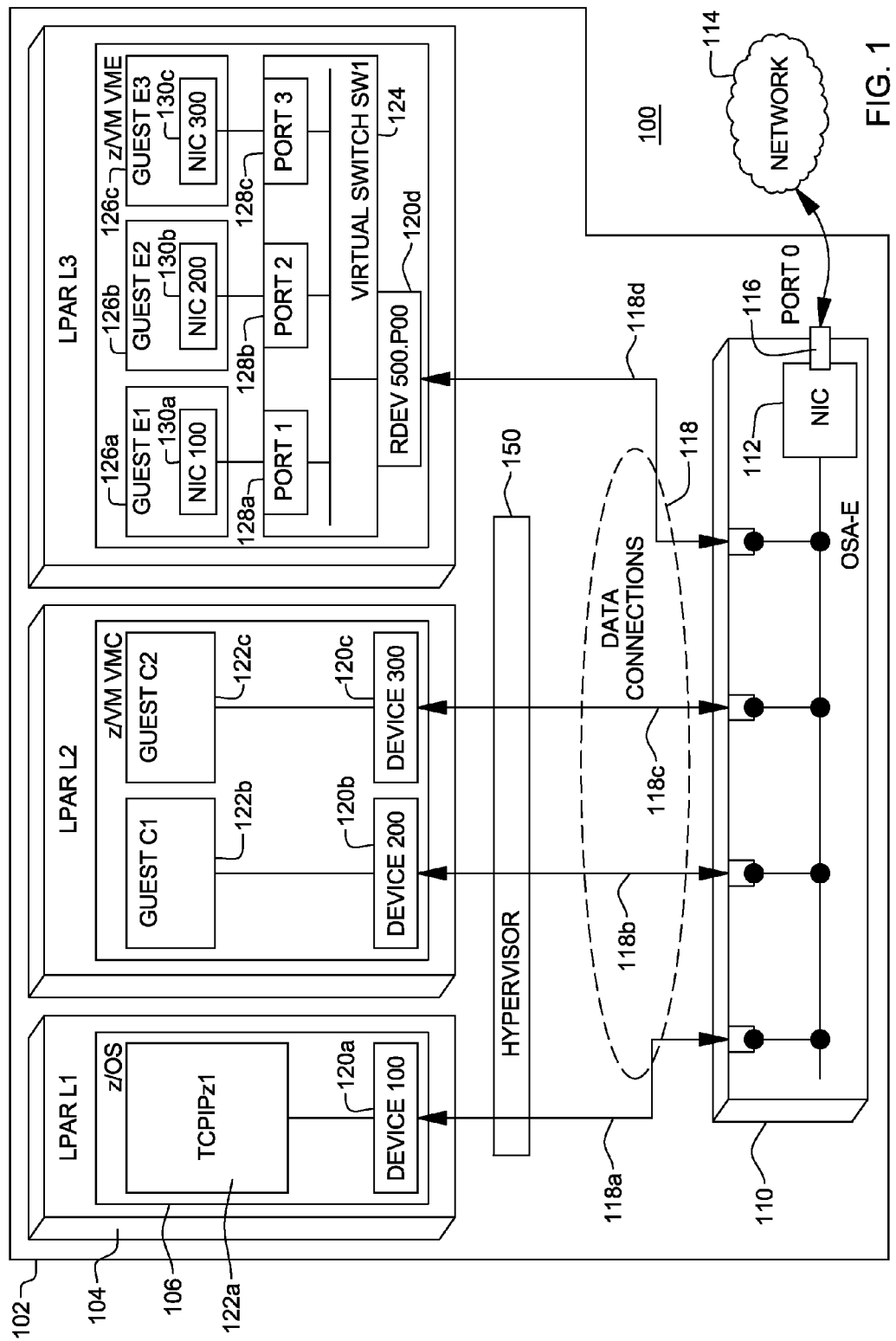
FIG. 1 depicts one embodiment of a shared resource environment to incorporate and use one or more aspects of the present invention.

One embodiment of a shared resource environment to incorporate and use one or more aspects of the present invention is described with reference to FIG. 1. In one example, a shared resource environment 100 is based, for instance, on the z/Architecture® offered by International Business Machines Corporation, Armonk, N.Y., and includes, for instance, a System z® server, also offered by International Business Machines Corporation. The z/Architecture® is described in a publication entitled "z/Architecture—Principles of Operation," IBM® Publication No. SA22-7832-07, Eighth Edition, February 2009, which is hereby incorporated herein by reference in its entirety. z/Architecture®, System z® and IBM® are registered trademarks of International Business Machines Corporation, Armonk, N.Y., U.S.A. Other names used herein may be registered trademarks, trademarks or product names of International Business Machines Corporation or other companies.

In this example, shared resource environment 100 includes a central processor complex (CPC) 102, having, for instance, one or more partitions or zones 104 (e.g., logical partitions LPAR L1-LPAR L3). Each logical partition has a resident operating system 106, which may differ for one or more of the logical partitions. For example, logical partition 1 includes the z/OS® operating system, offered by International Business Machines Corporation; logical partition 2 is executing a z/VM® operating system, offered by International Business Machines Corporation; and logical partition 3 is operating an enhanced z/VM® operating system. Although in this example, three logical partitions are described, other embodiments can include more, less or the same number of logical partitions. Further, one or more of the partitions may not be executing an operating system, and/or operating systems other than those described herein may be executed. Many other variations are possible. z/OS® and z/VM® are registered trademarks of International Business Machines Corporation, Armonk, N.Y.

One or more of the logical partitions are managed by a hypervisor 150, such as the Processor Resources/Systems Manager (PR/SM), offered by International Business Machines Corporation. The hypervisor enables System z® to virtualize the LPARs.

Each logical partition is coupled to a shared network connection, such as an OSA-Express adapter 110. Adapter 110 includes, for instance, a network interface card 112, which enables communication via an external network 114. External network 114 is coupled to the network interface card via a port 116. Network 114 may be used to communicate between the logical partitions of this shared resource environment or with processors of other processing environments.

Adapter 110 includes a plurality of data connections 118, each of which is coupled to a device within a logical partition. For instance, a data connection 118a is coupled to a device 120a in LPAR 1; data connections 118b, 118c are coupled to devices 120b, 120c, respectively, in LPAR 2; and a data connection 118d is coupled to a device 120d in LPAR 3. In one example, the data connections are queued direct I/O (QDIO) data connections.

Device 120a is further coupled to an entity 122a (such as TCP/IP, the protocol stack for z/OS®) in LPAR 1; devices 120b, 120c are further coupled to entities 122b, 122c (such as Guest C1, Guest C2), respectively, in LPAR 2; and device 120d is further coupled to a virtual switch 124 in LPAR 3.

Virtual switch 124 enables further sharing of data among entities 126a, 126b and 126c (e.g., Guest E1, E2 and E3) of LPAR 3. The virtual switch includes a plurality of ports 128a, 128b and 128c, each of which is coupled to a respective guest via a network interface card 130a, 130b, and 130c, respectively. The virtual switch allows the guests coupled thereto to communicate with one another without using the adapter or the external network.

Figure 2:
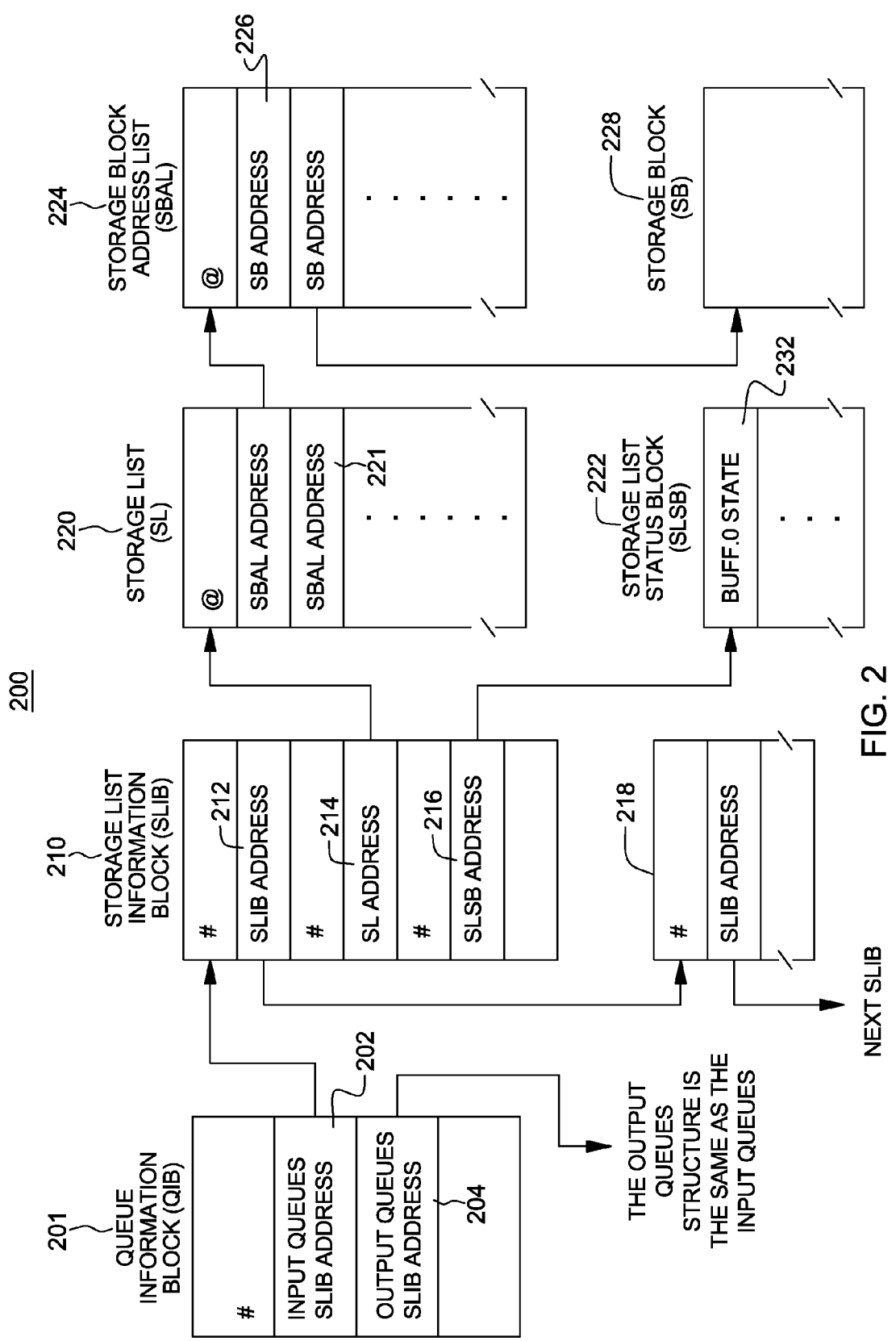
FIG. 2 depicts one embodiment of a queue structure used in receiving and storing data, in accordance with an aspect of the present invention.

To facilitate one or more aspects of the present invention, a data object is used to receive the incoming data. In one particular example, the data object is part of a queue, which is defined by a queue structure. In this example, the queue is a queued direct I/O (QDIO) input queue supported by a QDIO queue structure. Such queues are offered by International Business Machines Corporation, Armonk, N.Y. Details regarding one embodiment of a QDIO queue structure are described with reference to FIG. 2.

As depicted, a QDIO queue structure 200 includes a plurality of control structures. One such structure is a queue information block (QIB) 201 that includes information about the collection of QDIO input and output queues associated with a given data device (which forms a data connection). One QIB is defined per QDIO. In one example, QIB 201 includes an address 202 to an input queue's storage list information block (SLIB), and an address 204 to an output queue's SLIB.

SLIB address 202 points to the beginning of a storage list information block 210, which includes information about the QDIO input queue represented by this SLIB. There is one SLIB defined for each queue, and each SLIB includes a plurality of entries called storage list information block entries (SLIBEs). Each SLIBE includes information relevant to the queue associated with the SLIB. For example, SLIBE 212 includes an address to a next SLIB; SLIBE 214 includes an address to a storage list; and SLIBE 216 includes an address to a storage list status block. That is, SLIBE 212 points to a SLIb 218 for a next queue; SLIBE 214 points to the beginning of a storage list 220; and SLIBE 216 points to the beginning of storage list status block 222.

Storage list (SL) 220 defines the storage block address lists (SBALs) that are defined for each I/O buffer associated with each queue. One storage list is defined for each queue, which includes an entry for each storage block associated with the queue. SL provides information about the I/O buffer locations in main storage. In one example, storage list 220 includes one or more entries 221, each entry including an address to a storage block address list (SBAL) 224. Storage block address list 224 includes a plurality of storage block address list entries (SBALEs) 226, each of which includes the absolute storage address of a storage block (SB) 228. Collectively, the storage blocks addressed by all of the entries of a single SBAL constitute one of the many possible QDIO buffers of a QDIO queue. In one example, the number of these QDIO buffers equals 128.

As previously indicated, storage list information block entry 216 points to storage list status block (SLSB) 222. This status block includes status indicators that provide state information about the QDIO buffer that makes up a queue. Each entry 232 of storage list status block 222 includes state that corresponds to one SBAL (i.e., to one buffer of the queue). It includes, in accordance with an aspect of the present invention, ownership information for the buffer. The owner may be, for instance, the host or the shared network interface. For example, if in streaming large receive mode in which the network interface is performing the receive processing, the owner is the shared network interface until the shared interface gives up control or the host takes control.

The queue structure is used, in accordance with an aspect of the present invention, to receive data incoming at the shared network interface and to directly store that data in host memory. In particular, a QDIO input queue defined by the queue structure is registered for a particular connection (e.g., TCP connection) and for a particular function (e.g., the large receive function). Then, in response to data coming in for that particular connection and function at the shared network interface, the shared network interface, places the data directly in the queue, and in particular the queue's buffer in host memory.

Figure 3:
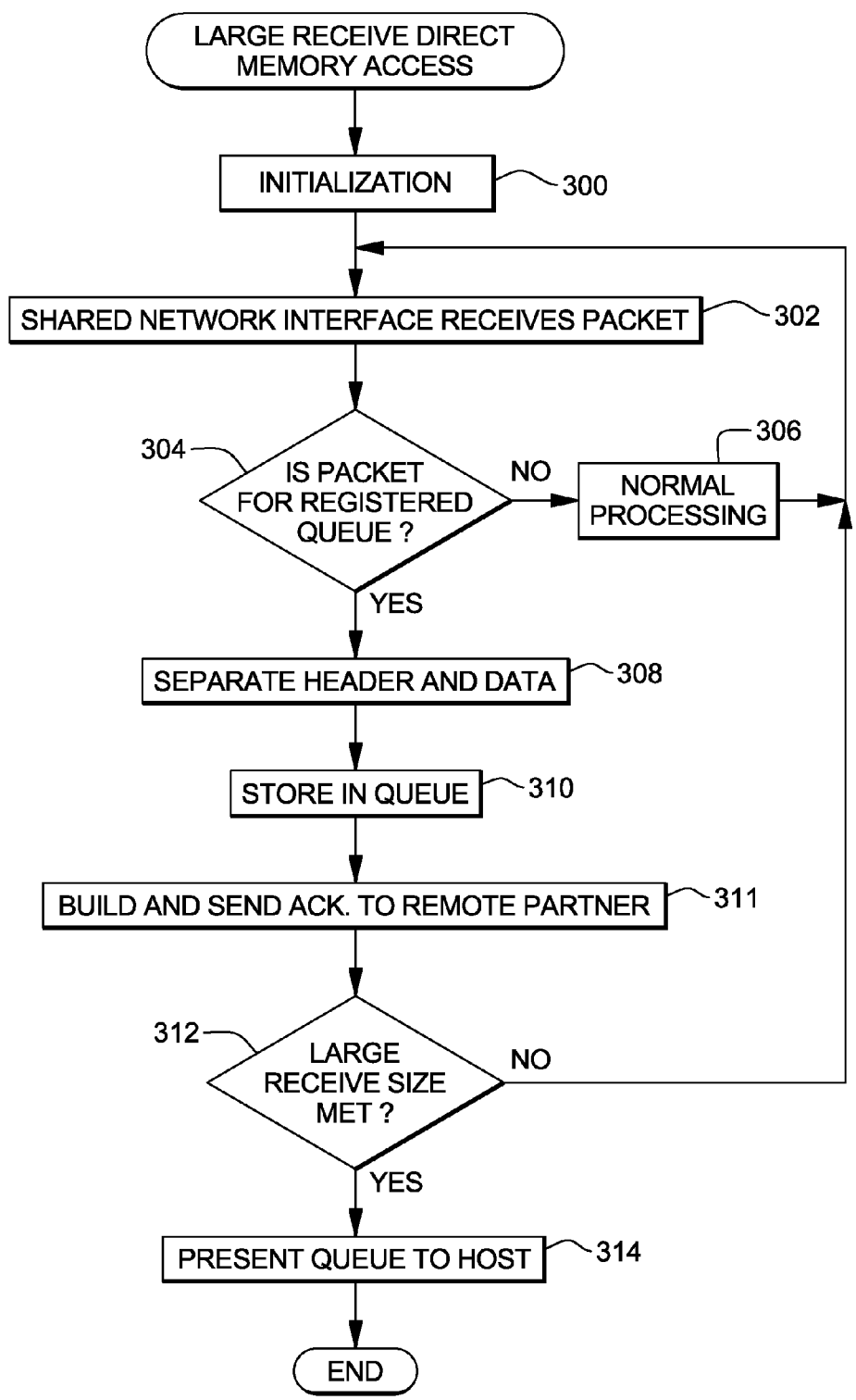
FIG. 3 depicts on embodiment of an overview of the logic to perform a large receive direct memory access, in accordance with an aspect of the present invention.

One embodiment of the logic associated with the large receive direct memory access of the present invention is described with reference to FIG. 3. Initially, certain initialization is performed, STEP 300. For instance, a large receive connection is initiated by the host operating system that informs the host stack (e.g., TCP) that this application (e.g., the OS) would like to use the large receive function for a given TCP connection defined by its four tuple—source/destination IP addresses and ports. The TCP stack then dynamically registers the given TCP connection with the shared network interface (e.g., OSA). In particular, the host stack initiates a function, referred to herein as the Set_QID function, which registers the large receive connection (i.e., the TCP connection to take advantage of the large receive function) to a specific queue. The TCP connection is registered with the shared network interface (e.g., OSA), which associates that connection with that specific queue. The shared network interface then builds a reply to the Set_QID request. Further details regarding Set_QID processing are described below.

Subsequent to registration, inbound traffic for the specific registered connection is then directed to the associated queue by the shared network interface. For instance, in response to the shared network interface receiving a packet, STEP 302, a determination is made as to whether this packet is for a registered queue (i.e., is this packet for the specific TCP connection assigned to a particular queue), INQUIRY 304. If the packet is not for a registered queue, then normal processing of the packet is performed, STEP 306, and processing continues with STEP 302. That is, the receive processing for the packet is performed by the host. However, if the packet is for a registered queue, then the shared network interface performs receive processing for this packet, instead of sending it to the host to perform the receive processing.

In one particular embodiment, in performing the receive processing, the shared network interface separates the header from the data of the packet, STEP 308. The header is stored in one part of the input buffer and the data is stored in another part of the input buffer, STEP 310. For example, the header is stored in the first one or two storage blocks of a buffer in memory pointed to by the first one or two SBALEs of the queue; and the data is stored in other contiguous storage blocks pointed to by other SBALEs (see, e.g., FIG. 2).

Thereafter, an intermediate TCP acknowledgment is built and sent to the sender of the data (i.e., remote partner), STEP 311. Further, a determination is made as to whether a specified large receive size has been met, INQUIRY 312. If not, then processing continues with STEP 302, in which further packets may be received. However, if the large receive size has been met, then the queue is presented to the host, STEP 314. For example, the shared network interface interrupts the host and indicates that ownership of the input buffer is now with the host. The ownership is represented in the storage list status block of the queue, as an example.

Figure 4A:
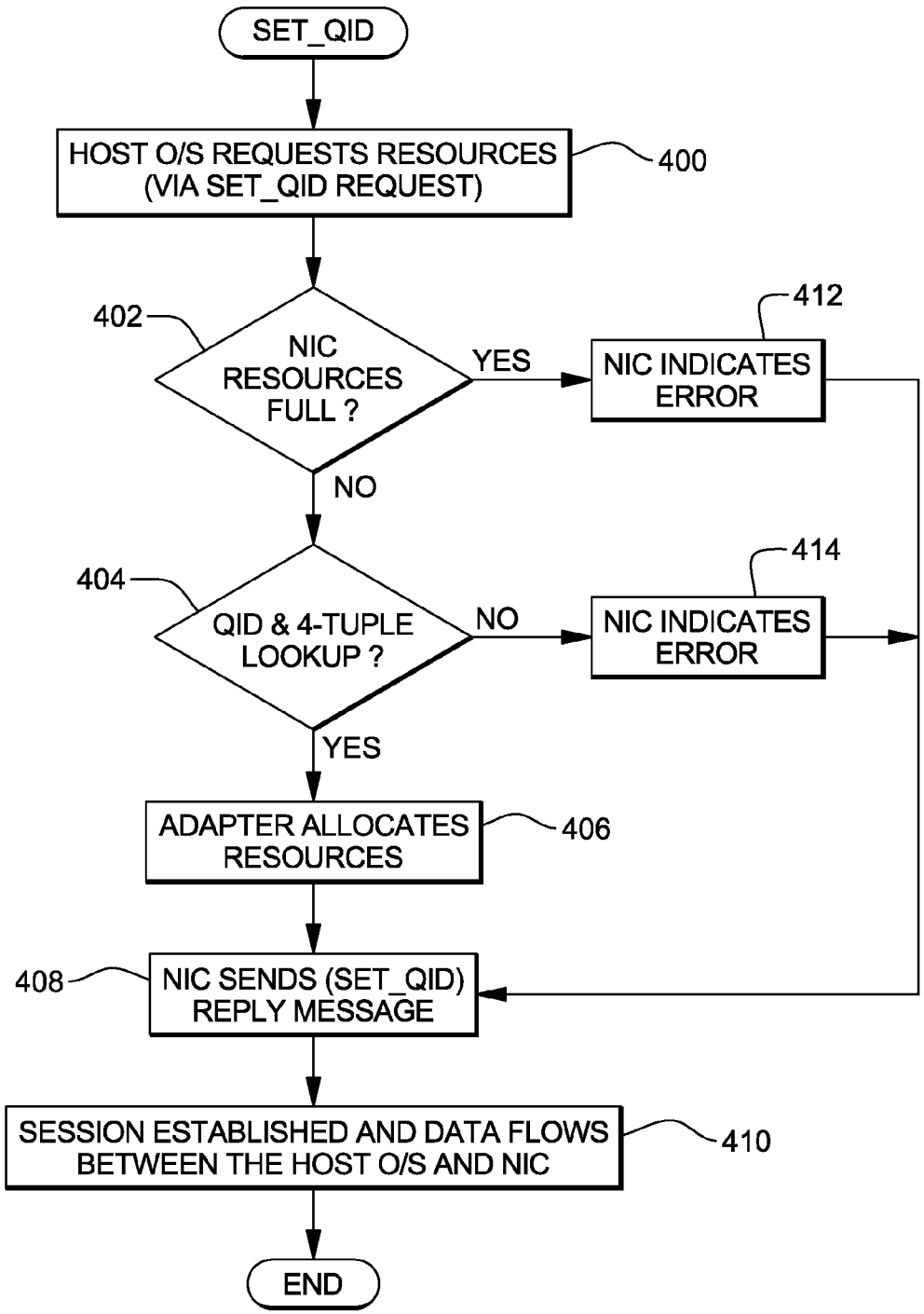
FIG. 4A depicts one embodiment of the logic of a Set_QID function used to register a connection with a queue for receive processing, in accordance with an aspect of the present invention.
Figure 4B:
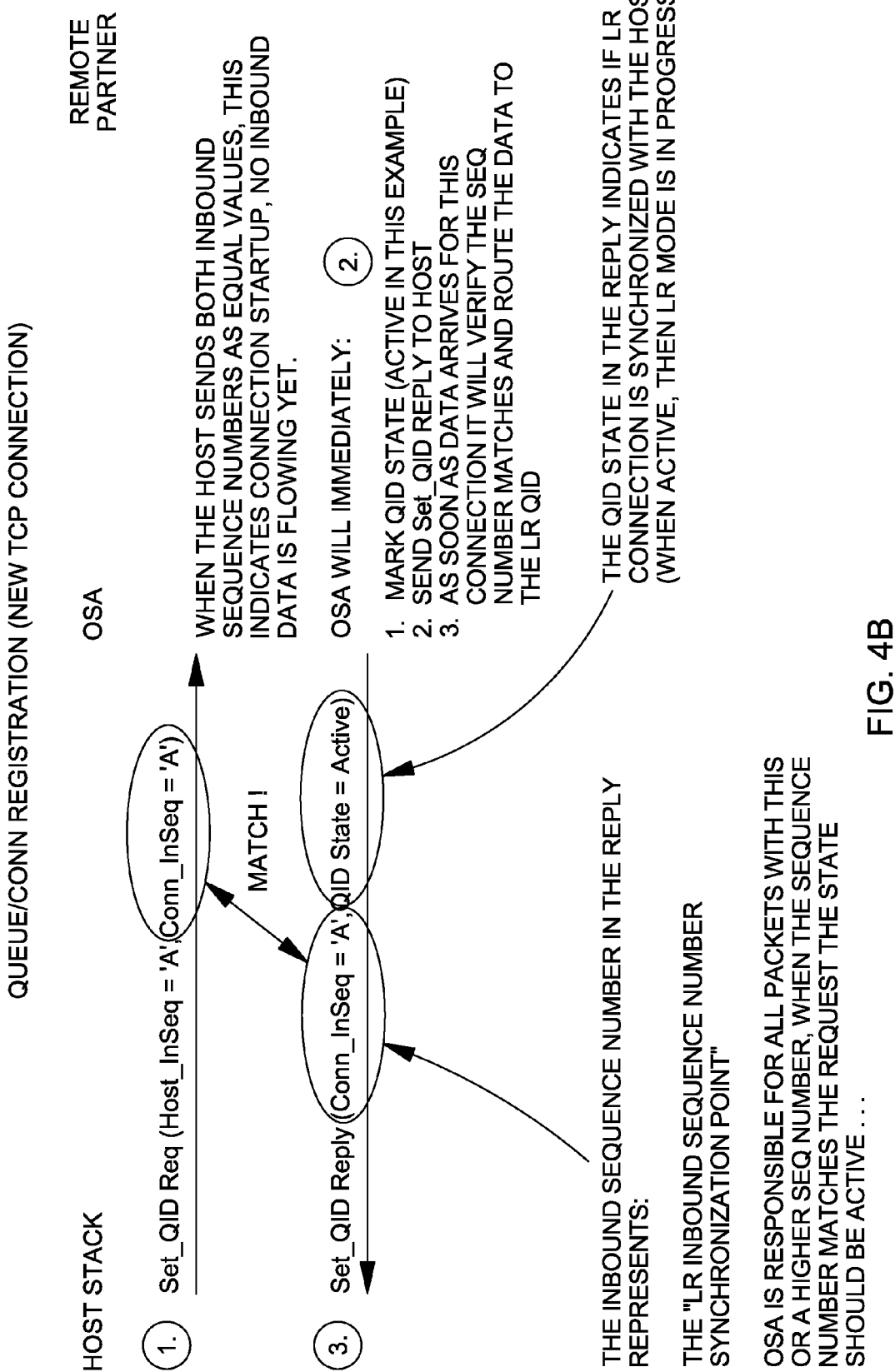
FIG. 4B depicts one embodiment of the logic to register a connection, in accordance with an aspect of the present invention.
Figure 5:
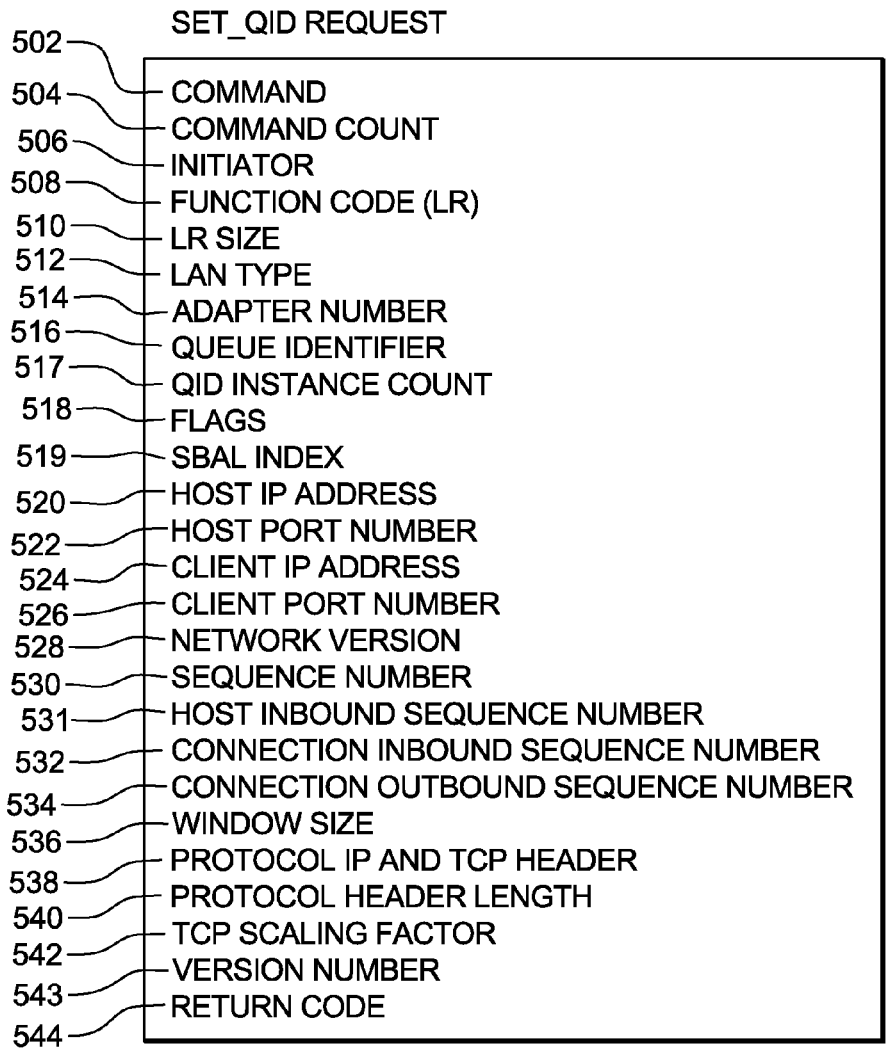
FIG. 5 depicts one example of the fields associated with a Set_QID request, in accordance with an aspect of the present invention.
Figure 6:
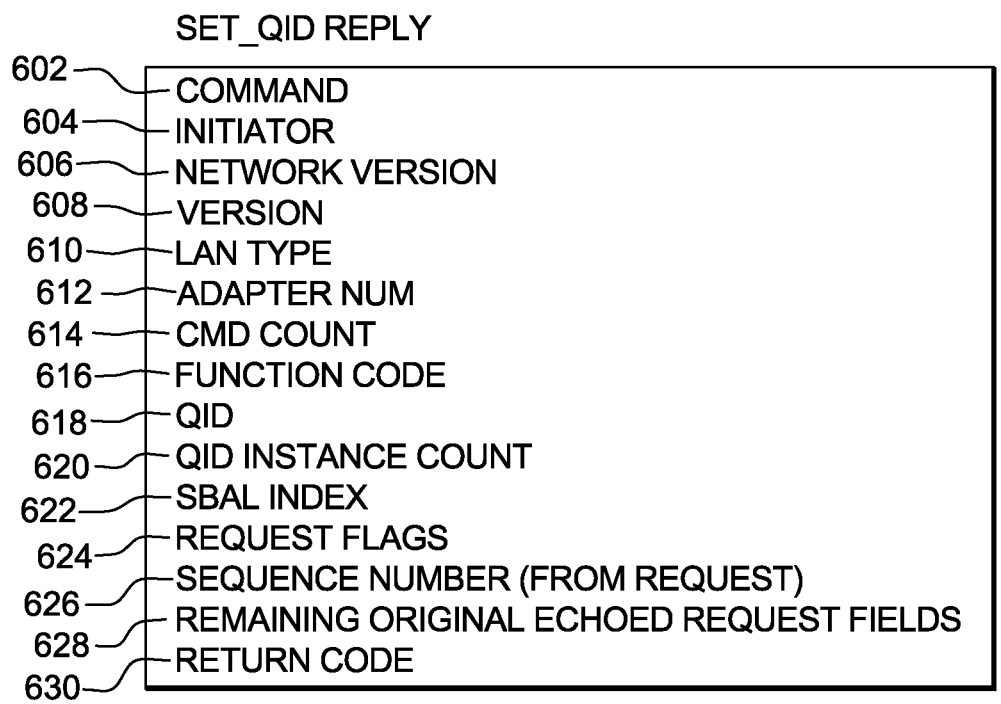
FIG. 6 depicts one embodiment of the fields associated with a Set_QID reply, in accordance with an aspect of the present invention.

Further details regarding registration of the input queues are described with reference to FIGS. 4A-6. In particular, FIG. 4A depicts one embodiment of the logic of the Set_QID function; FIG. 4B depicts one embodiment of the logic to register a connection; FIG. 5 depicts one example of a Set_QID request; and FIG. 6 depicts one example of a Set_QID reply.

Referring initially to FIG. 4A, the host operating system requests specific resources, such as a specific queue for a particular connection for a specific function, via a Set_QID request, STEP 400. One example of this request is described with reference to FIG. 5. A Set_QID request 500 includes, for instance, the following fields:

a) Command 502: Indicates the Set_QID request.
b) Command Count 504: Specifies how many sub-commands are included in this one command. That is, within one specific command, multiple commands can be embedded. For instance, a Set_QID is issued to allocate the queue, and a sub-command can be embedded in the command that starts the queue. Other examples are possible.
c) Initiator 506: Specifies the initiator of the Set_QID request, which can be the operating system or the shared network interface. In this example, it is the operating system.
d) Function Code 508: Specifies the function to be performed. In this case, it is the large receive (LR) process.
e) LR Size 510: Indicates the amount of data to be received prior to interrupting the host.
f) LAN Type 512: Specifies the type of the local area network connected to the shared network interface. In this example, it is Ethernet.
g) Adapter Number 514: Indicates the specific port on the shared network interface. It is the port on the NIC.
h) Queue Identifier 516: Indicates the identifier of the queue to be assigned.
i) QID Instance Count 517: Specifies the instance of the queue. When the QID is created, it is marked with an instance ID to keep track of the queue. The instance count is set on the Set_QID and is to match subsequent Mod_QID and Del_QID commands issued.
j) Flags 518: Include, for instance, set flags, such as SBAL header size, a TCP timestamp option, and a takeover QID; and modify flags designating, for instance, initiation of toggle on sequence, completion of toggle on and a toggle off;
k) SBAL Index 519: SBAL Index is the starting SLSB index to use to access the starting SBAL for the beginning of the LR operation.
l) Host IP Address 520: Indicates the IP address of the host.
m) Host Port Number 522: Specifies the port number associated with the IP protocol; e.g., TCP port numbers.

n) Client IP Address 524: Client IP Address is the IP address of the client which is the sending or source host in the LR operation.
o) Client Port Number 526: Client Port Number is the TCP Port Number associated with the client which is the sending or source host in the LR operation.
p) Network Version 528: Specifies whether TCP/IP is IP Version 4 or IP Version 6, as examples.
q) Sequence Number 530: This is a sequential number that increments each time a command is issued. It allows the request to be matched with a response.
r) Host Inbound Sequence Number 531: The first sequence number in the current host application LR operation (i.e., the next expected (or current) sequence number for the host TCP receive layer). The shared network interface uses this value to calculate the first partial LR operation. The host inbound sequence number is the number to be used to actually start the large receive operation. That is when the shared network interface takes over the connection.
s) Connection Inbound Sequence Number 532: The next expected inbound sequence number from the network. Since the traffic can already be flowing, this value is only an estimate.
t) Connection Outbound Sequence Number 534: Represents the outbound sequence number when the host application initiated the LR operation. The outbound sequence number is used by the OSA adapter to construct the intermediate ACK packets which are being sent as the TCP data is being received from the LAN.
u) Window Size 536: Indicates maximum amount of buffer space available on host.
v) Protocol IP and TCP Header 538: The Protocol IP and TCP Header is the actual IP and TCP headers which are used by OSA to construct the intermediate ACK packet sent by OSA to the client during the large receive operation.
w) Protocol Header Length 540: The Protocol Header Length is the length of the header described in the previous paragraph.
x) TCP Scaling Factor 542: TCP scaling factor is the TCP window scaling value used when the ACK is sent. This is used to increase the window size.
y) Version Number 543: Specifies a version of the format of the command, in case a change is made to the command at some point.
z) Return Code 544: Indicates a status result of the Set_QID command (e.g., successful, unsuccessful, etc.).

Returning to FIG. 4A, in response to issuing the request, the shared network interface determines whether there is a queue available to be assigned, INQUIRY 402. If a queue is available, a determination is made as to whether there is space in a connection data structure for this connection and queue, INQUIRY 404. In particular, a data structure (e.g., a table) is created with a certain number of entries (e.g., 1024). When a request is made for a queue for a particular connection, an attempt is made to place the QID of the queue and the 4-tuple id of the connection in the data structure. If it succeeds, then the assignment can proceed.

In response to a successful update of the connection data structure, the adapter allocates the queue, STEP 406. For instance, this includes defining the data structures and allocating the memory in the OSA adapter which are used by OSA to process the TCP receive function. This includes, for instance, fetching the host buffer space (SBALs) which are used by OSA to store the IP and TCP headers and data; defining of an out-of-order queue to handle any TCP packets received out of order; and monitoring code to determine when the OSA large receive operation should begin by examining the inbound sequence numbers in the TCP packets associated with the 4 tuple connection.

Moreover, the shared network interface sends a reply message to the Set_QID request, STEP 408. Further, a session is established and data flows between the host operating system and the shared network interface are enabled, STEP 410. Establishing a session indicates, for instance, the inbound sequence number received matches the next expected sequence number in the Set_QID primitive. At this point, OSA takes over the large receive operation. This completes processing.

Returning to INQUIRY 402, if there is not an available queue, an error is indicated, STEP 412, and processing continues with STEP 408. Likewise, if the connection table is full, INQUIRY 404, an error is indicated, STEP 414, and processing continues with STEP 408.

At STEP 408, a reply is provided. In one example, the reply message includes a number of fields, as described with reference to FIG. 6. For instance, a Set_QID reply 600 includes the following fields:

a) Command 602: Specifies the Set_QID reply.
b) Initiator 604: Specifies the initiator of the Set_QID reply, which can be the operating system or the shared network interface. In this example, it is the shared network interface.
c) Network Version 606: Specifies whether TCP/IP is IP Version 4 or IP Version 6, as examples.
d) Version 608: Specifies a version of the format of the reply.
e) LAN Type 610: Specifies the type of the local area network connected to the shared network interface. In this example, it is Ethernet.
f) Adapter Number 612: Indicates the specific port on the shared network interface. It is the port on the NIC.
g) CMD Count 614: Specifies how many sub-commands are included in this one command.
h) Function Code 616: Specifies the function to be performed. In this case, it is the large receive (LR) process.
i) QID 618: Indicates the identifier of the queue assigned.
j) QID Instance Count 620: Specifies the instance of the queue. When the QID is created, it is marked with an instance ID to keep track of the queue.
k) SBAL Index 622: SBAL Index is the starting SLSB index to use to access the starting SBAL for the beginning of the LR operation.
l) Request Flags 624: The request flags are an echo of the Set_QID request flags.
m) Sequence Number (from request) 626: This is a sequential number that increments each time a command is issued. It allows the request to be matched with the response.
n) Remaining Original Echoed Request Field 628: This field is an echo of the remaining Set_QID fields.
o) Return Code 630: A return status code of the reply command.

One example of a new TCP connection is depicted in FIG. 4B. This figure illustrates the case, "starting from the beginning" with a new connection. The host sends Set_QID with both inbound sequence numbers set to the same value (#1). When the inbound sequence numbers are set equal in the request, this indicates that the host believes data is not yet flowing (e.g., this is a new connection). This indicates that the host interface and network connection should be at the same sequence number (i.e., new TCP connection startup). OSA should register the connection and respond immediately (OSA does not have to find and process the first inbound packet for this connection).

OSA processes the Set_QID (#2). Assigns the connection to the QID. Since both sequence numbers are equal, OSA responds to the primitive immediately without waiting for inbound data (confirming inbound sequence numbers). OSA marks the connection Active. Any inbound packets for this connection will now be routed to the large receive (LR) queue. If the sequence number does not match, the LR connection will be flushed by OSA.

The host stack receives the reply and prepares to process (receive) inbound LR data (#3). Note that inbound LR data and the primitive reply can come in any order. The host is to be prepared for the LR data when the primitive request is sent.

In response to registering a connection (e.g., TCP) with a queue for large receive processing, in accordance with an aspect of the present invention, the shared network interface directs any inbound data associated with the LR connection (defined 4-tuple) to the associated input queue. The shared network interface assembles the packets and performs the applicable TCP IP receive processing without interrupting the host. As the packets arrive from the network for this connection, the shared network interface receive processing assembles the packets into a large contiguous data stream removing the headers to an out-of-band area (header area); builds and sends acknowledgements to the senders; and then, at a predefined point in time (e.g., receive size is met), the shared network interface interrupts the host and presents the large data object to the host (i.e., the storage blocks of the buffer of the queue pointed to by the QDIO SBAL structures). A pictorial representation of this processing is described with reference to FIG. 7A.

Figure 7A:
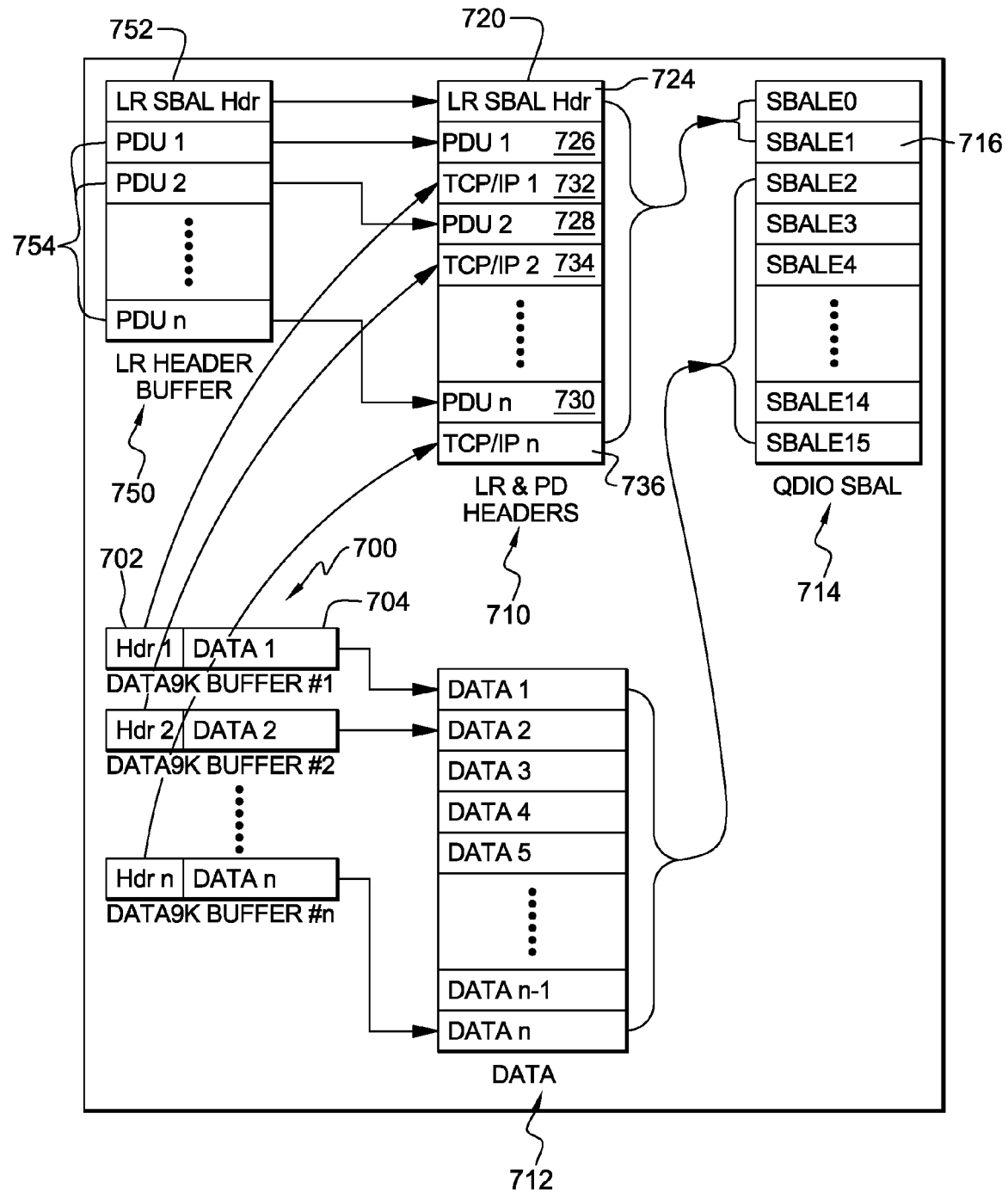
FIG. 7A is a pictorial representation of a large receive function, in accordance with an aspect of the present invention.

As shown in FIG. 7A, in response to receiving a data packet 700, the shared network interface separates header 702 from data 704 and places it in a separate part of the buffer from the data. For instance, each header 702 is placed in a headers area 710 and the data is placed in a data area 712. In this example, these areas are storage blocks pointed to by a SBAL 714. Specifically, SBAL 714 includes a plurality of entries (SBALEs) 716, and each entry 716 includes an address to a storage block. As shown, the first two storage blocks, in this example, pointed to by SBALE 0 and SBALE 1 include the headers, and the remaining storage blocks pointed to by SBALE 2 to SBALE 15 include the data. (In a further example, only one SBALE, such as SBALE 0, is for headers and the remaining SBALEs are for data. Other examples are also possible.) The data is placed directly in these storage blocks in host memory (initially without knowledge of the host) in the correct order, which is not necessarily the order received. The headers are also placed directly in the storage blocks, but they are in the order received, which is not necessarily the correct order. The storage blocks are collectively referred to as a buffer. In this example, there is one buffer per SBAL; and that buffer is defined by the SBALEs.

In this example, headers area 710 includes a plurality of entries 720, which are used to describe the incoming data. For instance, there is a LR SBAL HDR 724, which provides various information, including size of the header; network version; host IP address; client IP address; host port number; client port number; connection state; one or more flags; SBAL data length; first sequence number in this SBAL; next SBAL first sequence number; number of protocol data units in current SBAL; LR accumulation length-total accumulation of data in all current pending SBALs; offset to terminating PDU causing the current LR operation to end—for normal termination, this PDU points to the ending (e.g., FIN) packet; number of acks; number of out-of-order packets received during LR operation; and number of dropped segments, as examples.

Further, the header buffer includes the protocol data units as they are received (e.g., PDU1, PDU2 . . . PDUn) 726, 728, 730. In one example, a PDU includes a number of fields including, for instance, PDU banner or header; a length of the PDU; one or more PDU flags—indicating, e.g., out-of-order packet or if data crosses SBALs; offset to TCP data within current SBAL; length of TCP data; and TCP and IP headers from received packet (732, 734, 736).

To facilitate creating the header area 710, in one example, the shared network interface creates a LR Header Buffer 750. It includes a LR SBAL header 752 and an indication of the packets as they come off the wire 754. This buffer is used in storing the headers in LR and PD headers 710.

One embodiment of the logic to properly place inbound TCP segment data into the SBALE areas is described with reference to FIGS. 7B-7D.

Figure 7B:
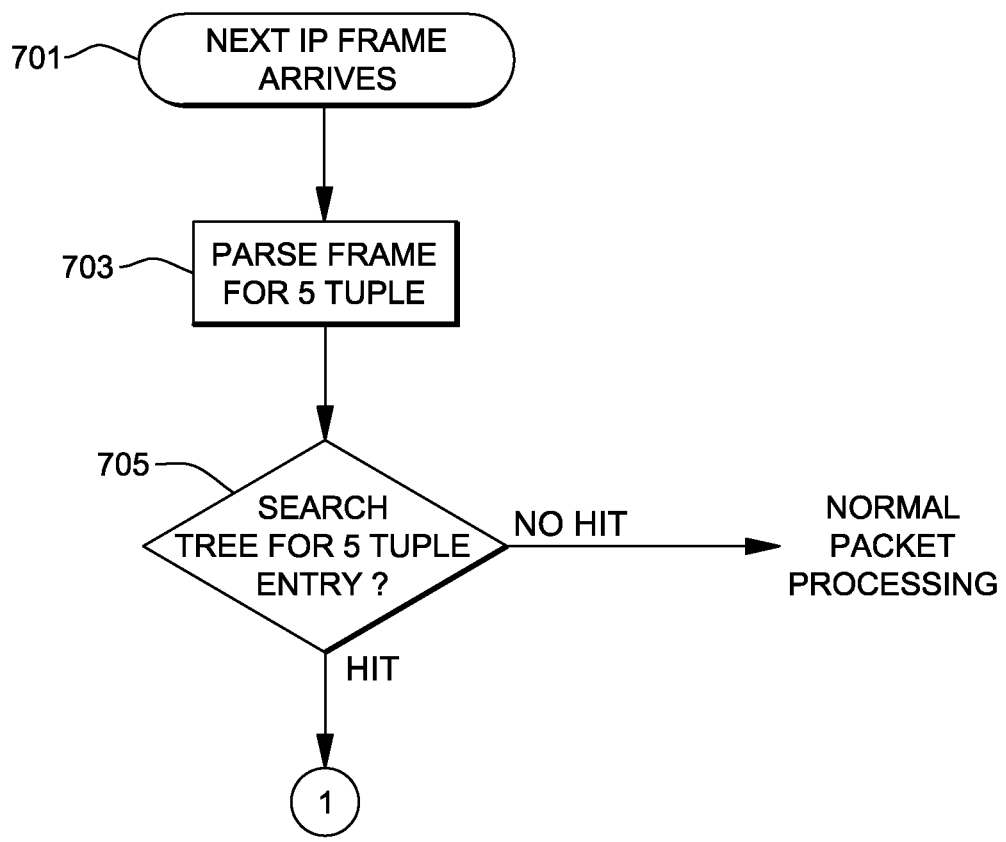
FIGS. 7B-7D depict one embodiment of further details associated with large receive processing, in accordance with an aspect of the present invention.

Referring initially to FIG. 7B, a next IP frame arrives from the network to the large receive microcode running in the shared network interface, STEP 701. The shared network interface extracts the five tuple information (e.g., source IP, destination IP, source port, destination port, an IP protocol id (e.g., TCP)) from the packet, and builds a search key with that information, STEP 703. It searches a large receive data structure (e.g., tree, table, etc.) for the five tuple entry to determine if this connection has been registered, INQUIRY 705. If there is no hit in the LR data structure, then processing is normal packet processing (i.e., non-LR receive processing).

Figure 7C:
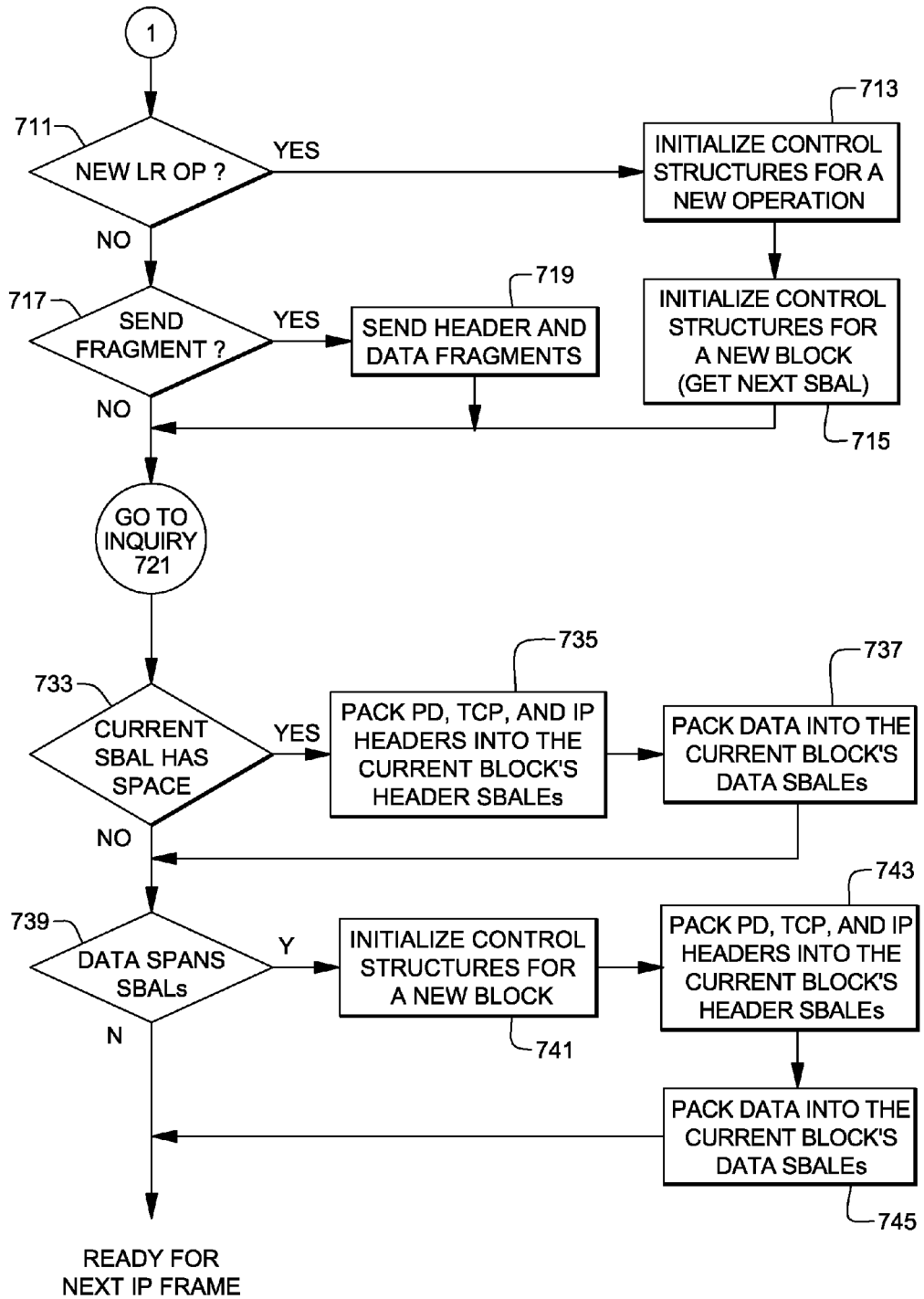
Figure 7D:
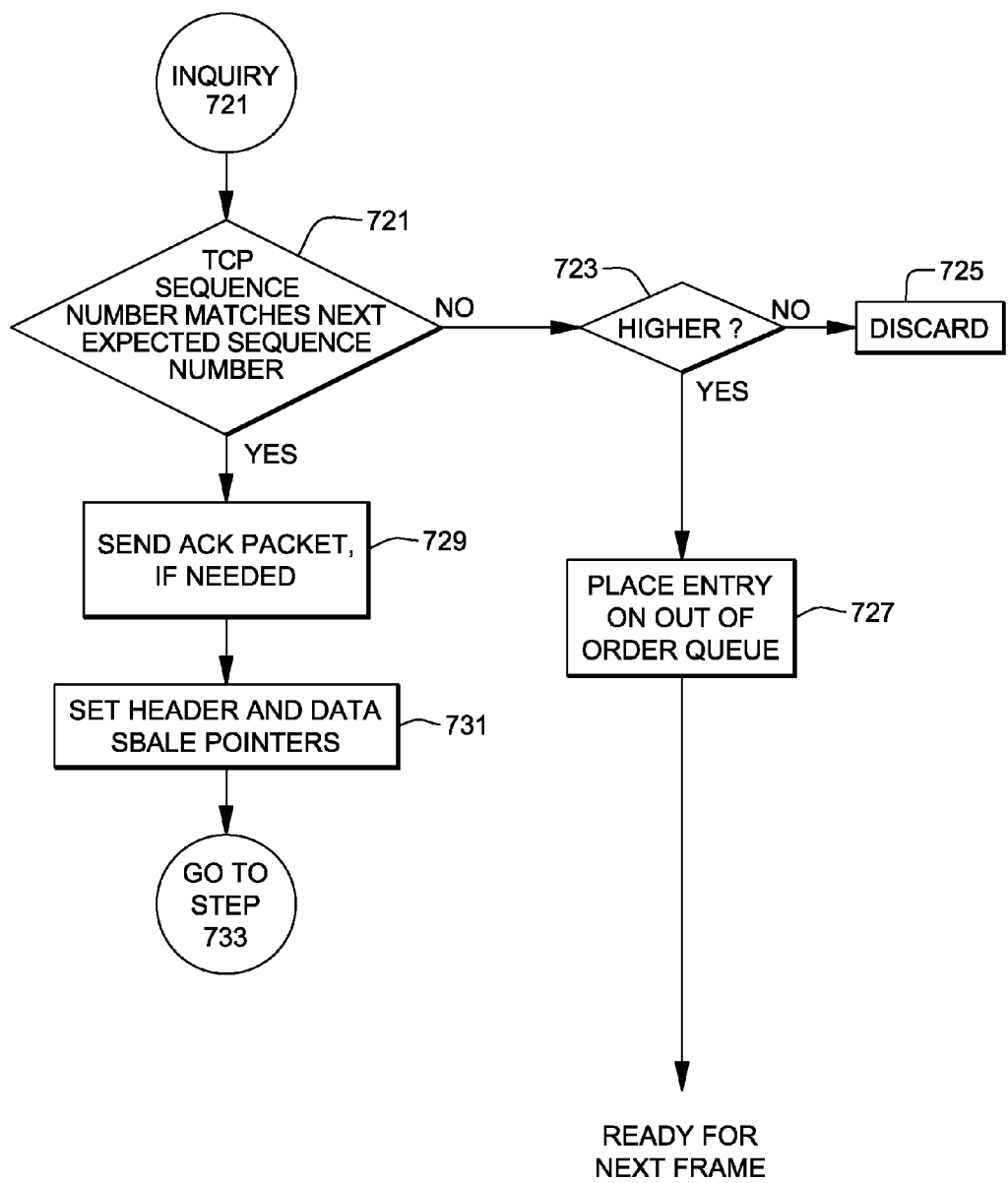

However, if the connection has been registered, then processing continues with determining whether a new large receive operation is specified, INQUIRY 711 (FIG. 7C). That is, is this the first packet that corresponds to a large receive operation. In particular, in the Set_QID, a sequence number is specified providing an id of the expected packet. When there is a hit on the connection, processing waits until the next expected sequence number matches the one that is in the frame. If it does match, then this is the start of the LR operation.

If it is a new large receive operation, then control structures (e.g., LR Headers) for a new operation are initialized, STEP 713. Further, control structures for a new block (get next SBAL) are also initialized, STEP 715. For instance, to obtain the next SBAL, the SBAL (Storage Block Address List) is fetched from the host which will determine the locations in host memory where the LR Headers and Data are to be directly placed. Thereafter, processing continues INQUIRY 721, as described below.

Returning to INQUIRY 711, if this is not a new large receive operation, then a determination is made as to whether the fragment is to be sent, INQUIRY 717. A fragment is a portion of a LR operation which has been received and reaches the most DMA efficient size for sending data across the I/O interface to host memory. For example, in System z® I/O, a DMA size of 16K or less may be the most efficient size. Also, the number of entries in a DMA buffer list can affect the DMA efficiency. If the list grows to the most efficient size, a DMA operation is initiated to transfer the data from OSA memory into host memory. The next packet to arrive is then placed in the next DMA operation. If the fragment is full, then the header and data fragments are sent to the host, STEP 719. Thereafter, or if the fragment is not to be sent, processing continues with INQUIRY 721, as described herein.

At INQUIRY 721 (FIG. 7D), a determination is made as to whether the TCP sequence number matches the next expected sequence number. If no, then a further determination is made as to whether the sequence number is higher than the number expected, INQUIRY 723. If it is not, then the packet is discarded, STEP 725. If it is higher than expected, then the packet is placed in an out-of-order queue, STEP 727, and processing continues for the next frame.

Retuning to INQUIRY 721, if the sequence numbers match, then an acknowledgment packet is sent to the client, if needed, STEP 729. That is, in the Set_QID request, an acknowledgement threshold is specified. If the acknowledgment threshold is reached, then an acknowledgement is generated and sent back to the client.

Additionally, the header and data SBALE pointers are set, STEP 731, and processing continues with determining if the current SBAL has space, INQUIRY 733 (FIG. 7C). If the current SBAL does have space, then the PD, TCP and IP headers are packed into the current block's header SBALEs, STEP 735, and the data is packed into the current block's data SBALEs, STEP 737. Thereafter, or if the current SBAL does not have space, a determination is made as to whether the data spans SBALs, INQUIRY 739. If the data does span SBALs, then control structures for a new block are initialized, STEP 741. Further, the PD, TCP and IP headers are packed into the current block's header SBALEs, STEP 743, and the data is packed into the current block's data SBALEs, STEP 745. Thereafter, or if the data does not span SBALs, processing continues for the next IP frame. This completes processing.

In a further aspect of the present invention, if usage of the specific input queue is no longer needed, a deregistration process is employed. In one example, this is performed using a delete queue id (Del_QID) request. One embodiment of the logic associated with this request is described with reference to FIG. 8.

Figure 8:
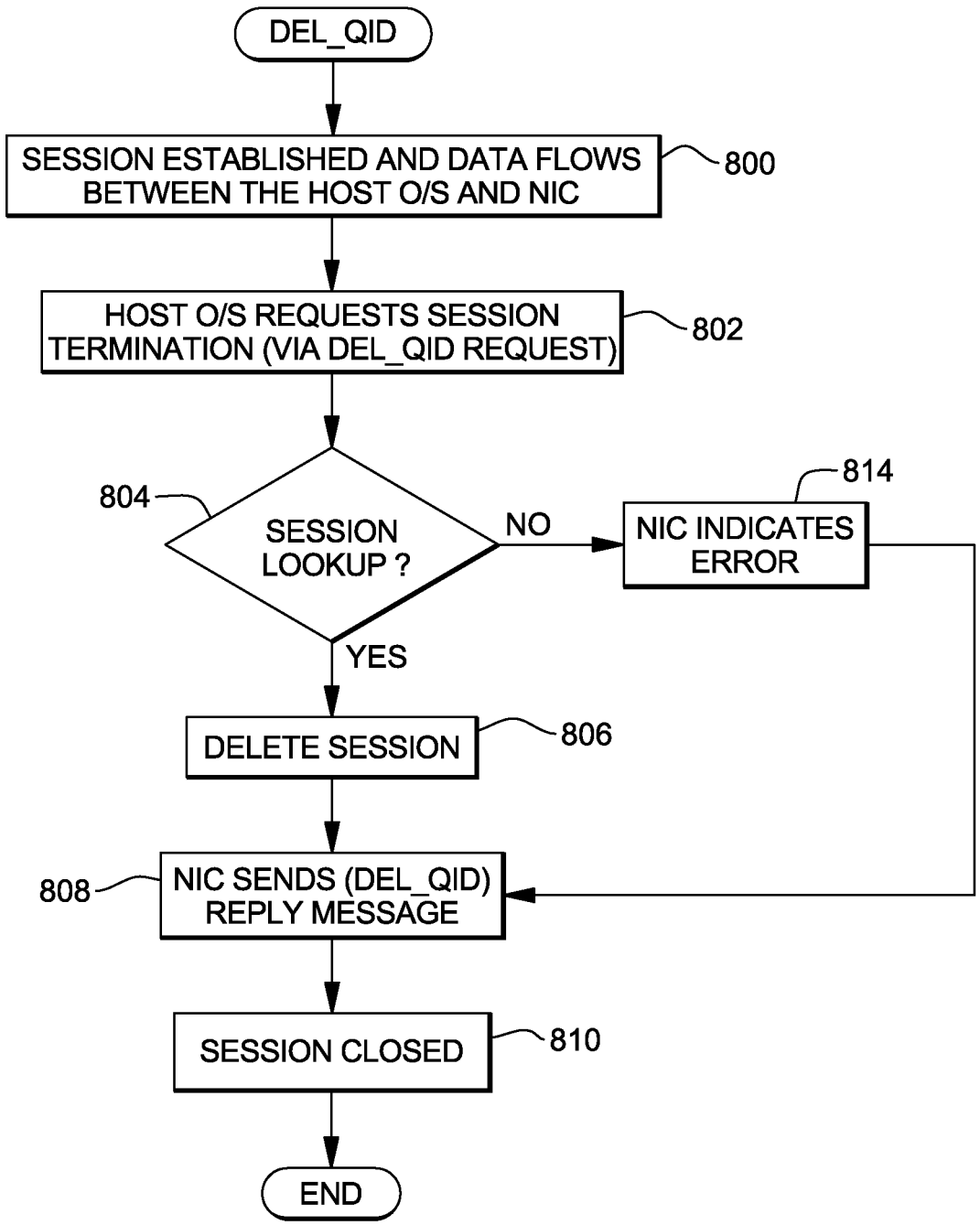
FIG. 8 depicts one embodiment of the logic of a delete QID (Del_QID) function used to deregister a connection, in accordance with an aspect of the present invention.
Figure 9:
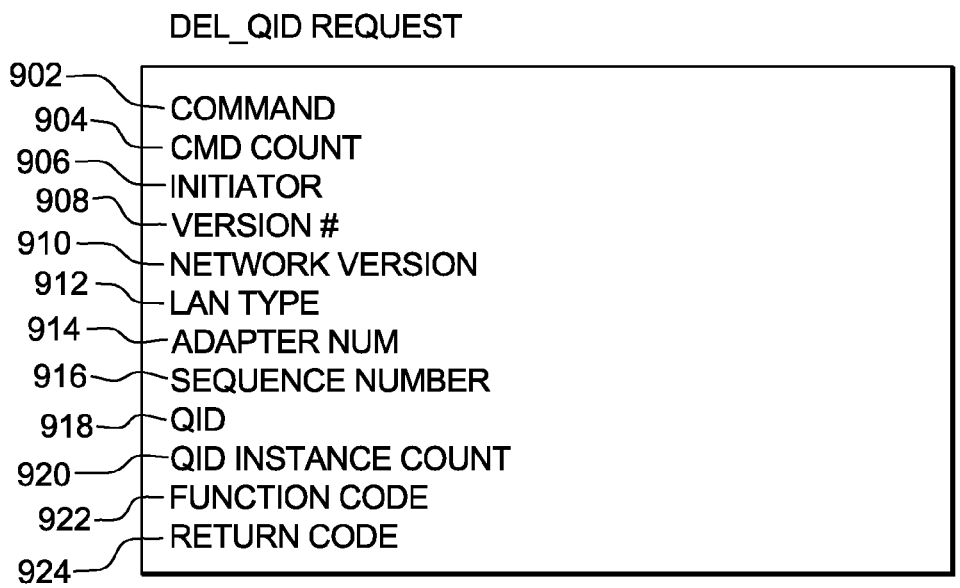
FIG. 9 depicts one example of the fields of a Del_QID request, in accordance with an aspect of the present invention.

Referring to FIG. 8, in response to the Set_QID request, a session has been established and data flows between the host operating system and the shared network interface, STEP 800. At some point in time, the host operating system requests the session to be terminated by, for instance, issuing a Del_QID request, STEP 802. One example of this request is described with reference to FIG. 9.

In one example a Del_QID request 900 includes the following fields:
  a) Command 902: Indicates the Del_QID request.
  b) CMD Count 904: Specifies how many sub-commands are included in this one command.
  c) Initiator 906: Specifies the initiator of the Del_QID request, which can be the operating system or the shared network interface. In this example, it is the operating system.
  d) Version Number 908: Specifies a version of the format of the command, in case a change is made to the command at some point.
  e) Network Version 910: Specifies whether TCP/IP is IP Version 4 or IP Version 6, as examples.
  f) LAN Type 912: Specifies the type of the local area network connected to the shared network interface. In this example, it is Ethernet.
  g) Adapter Number 914: Indicates the specific port on the shared network interface. It is the port on the NIC.
  h) Sequence Number 916: This is a sequential number that increments each time a command is issued. It allows the request to be matched with the response.
  i) QID 918: Indicates the identifier of the queue to be assigned.
  j) QID Instance Count 920: Specifies the instance of the queue. When the QID is created, it is marked with an instance ID to keep track of the queue. The instance ID is to match the instance ID returned on the Set_QID.
  k) Function Code 922: Specifies the function for which the queue was assigned. In this case, it is the large receive (LR) process.
  l) Return Code 924: Indicates a status result of the Del_QID command (e.g., successful, unsuccessful, etc.).

Returning to FIG. 8, in response to receiving the request, the shared network interface performs a session lookup in, for instance, a table to determine if there is a session to be deleted, INQUIRY 804. If there is such a session, the session is deleted, STEP 806. When a session is terminated, the 4 tuple knowledge is removed from the OSA routing tables and the resources allocated on the Set_QID are freed. The shared interface network then sends a delete QID (Del_QID) reply message, STEP 808, and the session is closed, STEP 810.

Returning to INQUIRY 804, if there is no session to be deleted, then an error is indicated, STEP 814, and processing continues with STEP 808, in which the Del_QID reply message is sent.

Figure 10:
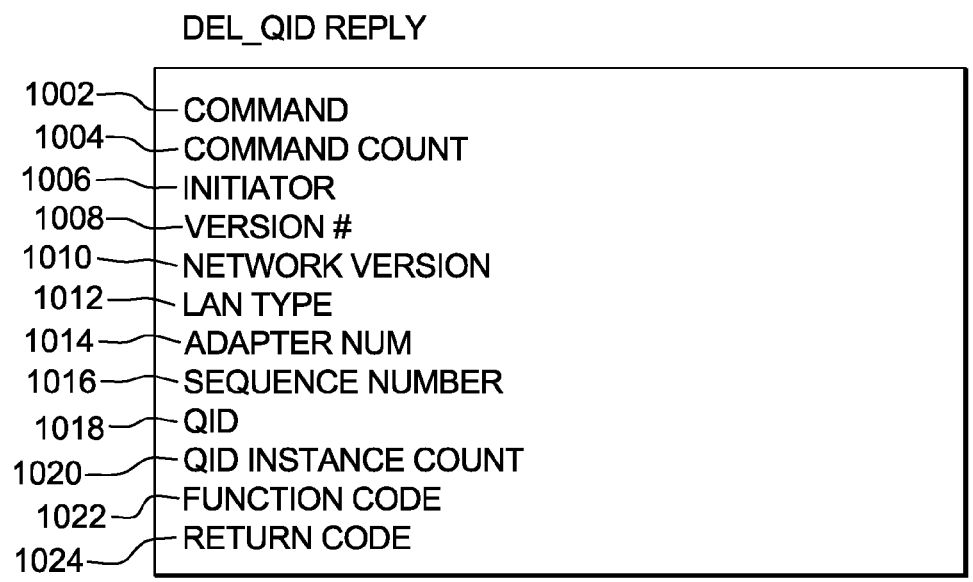
FIG. 10 depicts one embodiment of the fields of a Del_QID reply, in accordance with an aspect of the present invention.

One example of a reply message is described with reference to FIG. 10. In one example, a Del_QID reply 1000 includes the following fields:
  a) Command 1002: Indicates the Del_QID reply.
  b) Command Count 1004: Specifies how many sub-commands are included in this one command.
  c) Initiator 1006: Specifies the initiator of the Del_QID reply, which can be the operating system or the shared network interface. In this example, it is the shared network interface.
  d) Version Number 1008: Specifies a version of the format of the command.
  e) Network Version 1010: Specifies whether TCP/IP is IP Version 4 or IP Version 6, as examples.
  f) LAN Type 1012: Specifies the type of the local area network connected to the shared network interface. In this example, it is Ethernet.
  g) Adapter Num 1014: Indicates the specific port on the shared network interface. It is the port on the NIC.
  h) Sequence Number 1016: This is a sequential number that increments each time a command is issued. It allows the request to be matched with the response.
  i) QID 1018: Indicates the identifier of the queue to be assigned.
  j) QID Instance Count 1020: Specifies the instance of the queue. When the QID is created, it is marked with an instance ID to keep track of the queue.
  k) Function Code 1022: Specifies the function for which the queue was assigned. In this case, it is the large receive (LR) process.
  l) Return Code 1024: Indicates a status result of the Del_QID reply (e.g., successful, unsuccessful, etc.).

Figure 11:
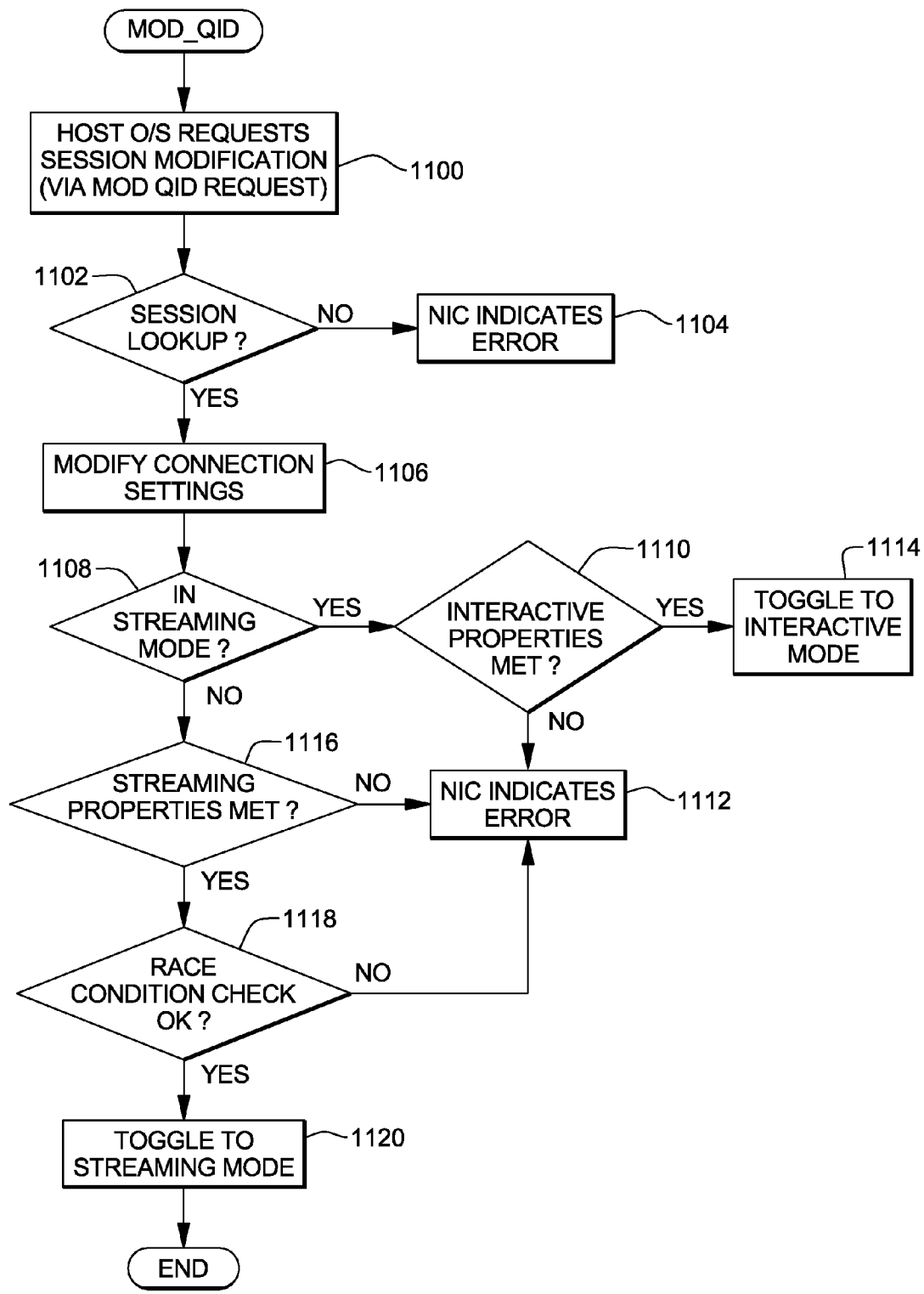
FIG. 11 depicts one embodiment of the logic of a modify QID function (Mod_QID) used to modify the state of a registered connection, in accordance with an aspect of the present invention.

In yet a further aspect of the present invention, the host may decide that it would like to end the streaming mode, and instead, be in interactive mode for the QID and TCP connection. That is, the host may decide (even during the large receive process) that it will perform the receive processing, instead of having it performed by the shared network interface. To perform this toggle, in one example, a modify QID (Mod_QID) request is issued. It allows the host stack (e.g., TCP) to dynamically alter various attributes of the current QID, including for the large receive function, to alter the current large receive state allowing the host to toggle between streaming and interactive modes on the QID and TCP connection. One embodiment of the logic associated with the modify QID request is described with reference to FIG. 11.

Figure 12:
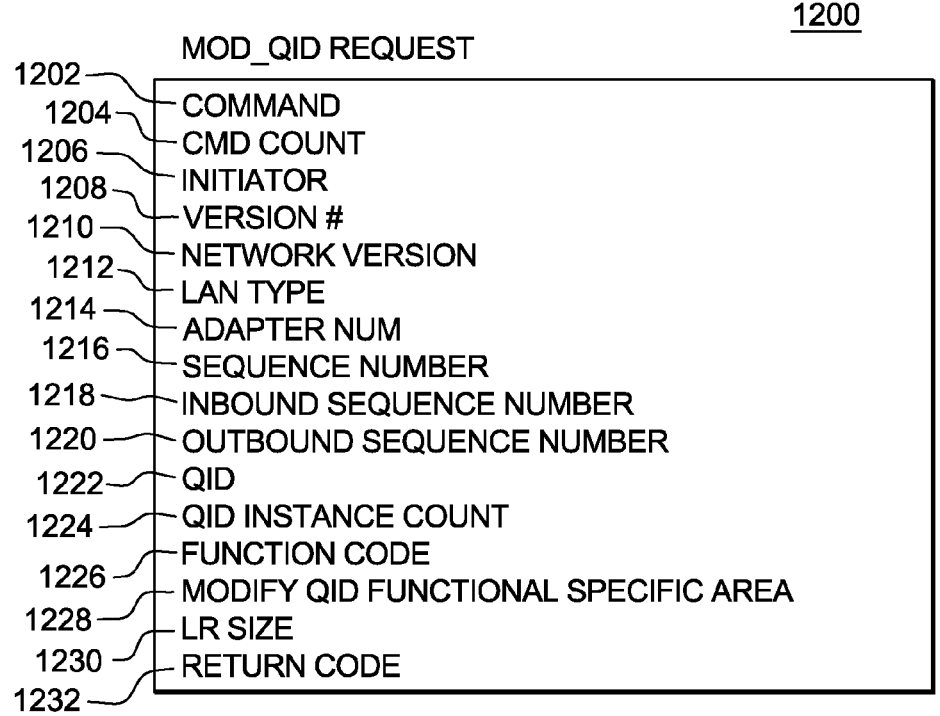
FIG. 12 depicts one embodiment of the fields of a Mod_QID request, in accordance with an aspect of the present invention.

Initially, the host operating system requests a session modification via a modify QID request, STEP 1100. One embodiment of the modify QID request is described with reference to FIG. 12. In one example, a modify QID request 1200 includes the following fields:

a) Command 1202: Indicates the Mod_QID request.
b) CMD Count 1204: Specifies how many sub-commands are included in this one command.
c) Initiator 1206: Specifies the initiator of the Mod_QID request, which can be the operating system or the shared network interface. In this example, it is the operating system.
d) Version Number 1208: Specifies a version of the format of the command, in case a change is made to the command at some point.
e) Network Version 1210: Specifies whether TCP/IP is IP Version 4 or IP Version 6, for examples.
f) LAN Type 1212: Specifies the type of the local area network connected to the shared network interface. In this example, it is Ethernet.
g) Adapter Number 1214: Indicates the specific port on the shared network interface. It is the port on the NIC.
h) Sequence Number 1216: This is a sequential number that increments each time a command is issued. It allows the request to be matched with the response.
i) Inbound Sequence Number 1218: The next expected inbound sequence number from the network. Since the traffic can already be flowing, this value is only an estimate.
j) Outbound Sequence Number 1220: Represents the outbound sequence number when the host application initiated the LR operation.
k) QID 1222: Indicates the identifier of the queue to be assigned.
l) QID Instance Count 1224: Specifies the instance of the queue. When the QID is created, it is marked with an instance ID to keep track of the queue.
m) Function Code 1226: Specifies the function for which the queue was assigned. In this case, it is the large receive (LR) process.
n) Modify QID Functional Specific Area 1228: This area defines, for instance, set flags, such as SBAL Hdr size, a TCP timestamp option, and a takeover QID; and modify flags, such as state modification request; no state change requested; initiate toggle on sequence; complete toggle on sequence; toggle off.
o) LR Size 1230: Indicates the amount of data to be received prior to interrupting the host.
p) Return Code 1232: Indicates a status result of the Mod_QID command (e.g., successful, unsuccessful, etc.).

Returning to FIG. 11, in response to the modify QID request, a determination is made as to whether there is a valid session, INQUIRY 1102. If not, an error is indicated, STEP 1104. However, if there is a valid session, then connection settings are modified as described herein, STEP 1106. In particular, a determination is made as to whether processing is in streaming mode, INQUIRY 1108. If yes, then a determination is made as to whether the interactive properties are met, INQUIRY 1110. If not, then an error is indicated, STEP 1112. However, if the interactive properties are met, then a toggle is made to interactive mode, STEP 1114. This is described in further detail below.

Returning to INQUIRY 1108, if not in streaming mode, then a determination is made as to whether the streaming properties are met, INQUIRY 1116. If not, then an error is indicated, STEP 1112. However, if the streaming properties are met, then a determination is made as to whether the race condition check is ok, INQUIRY 1118. If not, again an error is indicated, STEP 1112. If the race condition check is satisfactory, then a toggle is made to streaming mode, STEP 1120. For instance, a race condition is related to the synchronization of the TCP sequence number with the OSA adapter. The host can specify the host inbound sequence number, but if TCP traffic is already flowing on the connection, by the time the Mod_QID is processed by OSA, the TCP sequence number might have already been processed.

Figure 13:
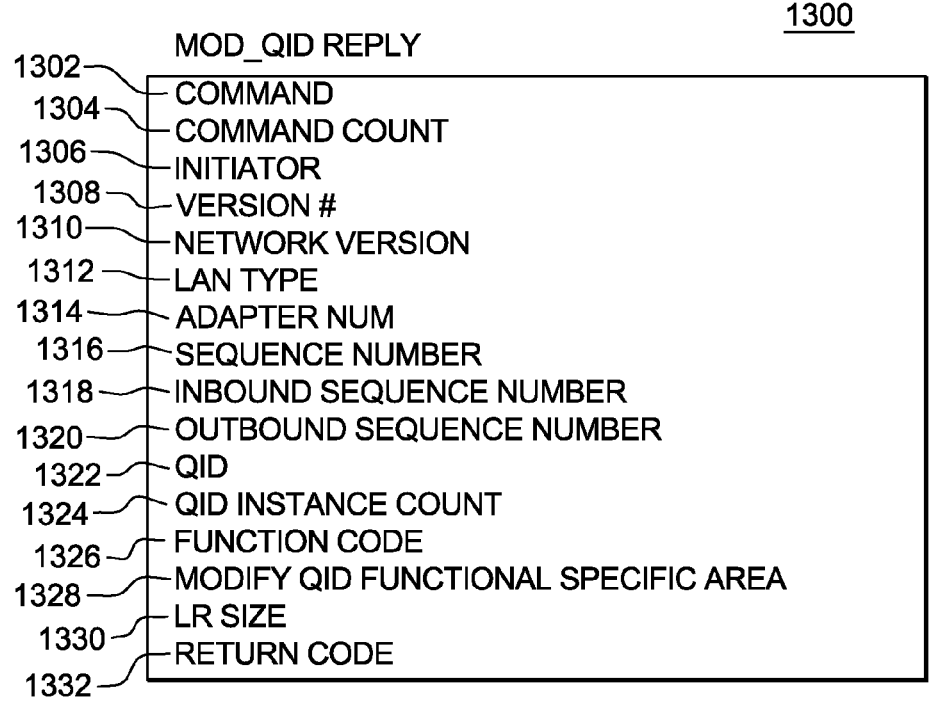
FIG. 13 depicts one embodiment of the fields of a Mod_QID reply, in accordance with an aspect of the present invention.

In response to issuing the Mod_QID request, a reply is provided. One embodiment of the reply used in response to a modify QID request is described with reference to FIG. 13. In one example, a modify QID reply 1300 includes the following fields:

a) Command 1302: Indicates the Mod_QID reply.
b) Command Count 1304: Specifies how many sub-commands are included in this one command.
c) Initiator 1306: Specifies the initiator of the Mod_QID reply, which can be the operating system or the shared network interface. In this example, it is the shared network interface.
d) Version Number 1308: Specifies a version of the format of the command.
e) Network Version 1310: Specifies whether TCP/IP is IP Version 4 or IP Version 6, as examples.
f) LAN Type 1312: Specifies the type of the local area network connected to the shared network interface. In this example, it is Ethernet.
g) Adapter Number 1314: Indicates the specific port on the shared network interface. It is the port on the NIC.
h) Sequence Number 1316: This is a sequential number that increments each time a command is issued. It allows the request to be matched with the response.
i) Inbound Sequence Number 1318: The next expected inbound sequence number from the network. Since the traffic can already be flowing, this value is only an estimate.
j) Outbound Sequence Number 1320: Represents the outbound sequence number when the host application initiated the LR operation.
k) QID 1322: Indicates the identifier of the assigned queue.
l) QID Instance Count 1324: Specifies the instance of the queue. When the QID is created, it is marked with an instance ID to keep track of the queue.
m) Function Code 1326: Specifies the function for which the queue is assigned. In this case, it is the large receive (LR) process.
n) Modify QID Functional Specific Area 1328: This includes an echo of the information in the functional area of the request.
o) LR Size 1330: Indicates the amount of data to be received prior to interrupting the host.
p) Return Code 1332: Indicates a status result of the Mod_QID reply (e.g., successful, unsuccessful, etc.).

Further details regarding toggling are described below. In one example, when the toggle sequence occurs, the adapter is to present the accumulated data to the stack without waiting to accumulate a full LR size, or the application will hang.

Signaling from the host stack (initiated by events on the Socket API layer) to the OSA is in place to support applications that toggle between streaming and interactive modes. The signaling includes sending a Modify QID to OSA, as described above, which initiates the "toggle on/off sequence". The Mod_QID primitive (signal) is used to switch to interactive mode or switch to streaming mode. The reply from OSA indicates if the switch was successful. Flags within the signal indicate if this Mod_QID signal is a toggle on or a toggle off request. The host socket layer calls services provided by the host stack lower layers to send the request to OSA.

The toggle primitive exchange includes either one or two request/response flows described as follows:

1. "Two Way Hand Shake" (One Mod_QID Request/Response)—The "Toggle On" sequence is completed with a single Mod_QID Request/Response exchange. The single request/response is used when OSA can process or find an inbound sequence number equal to the inbound sequence number sent in the request. This is also referred to as the "in sync" case.

2. "Four Way Hand Shake" (Two Mod_QID Requests/Responses)—The "Toggle On" sequence requires two Mod_QID Request/Responses to be exchanged. The second request/response is used when OSA finds a higher inbound sequence number than the sequence number sent in the request. In this case, a second exchange is used to complete the synchronization of the inbound sequence numbers.

The inbound sequence number in the Mod_QID reply from OSA determines if the host is to send another request. If the inbound sequence number in the reply is equal, the one request/response is used. When the number is not equal, then a second request/response is used. A negative reply from OSA terminates the LR connection (QID).

The initial QID (LR connection) registration and the toggle on/off sequence results in a corresponding QID state change. After OSA completes the connection registration processing associated with Set_QID, then the subsequent OSA processing is similar to a Mod_QID toggle on sequence. The main difference is the registering of the TCP connection information. OSA will attempt to resolve the initial inbound sequence number and transition into LR mode (QID Active state).

Toggle Off Sequence

When in the QID Active state (streaming mode), and the stack's socket receive API code processes a receive-type call that does not have MSG_WAITALL set, or a Send-type call this will cause the host stack to signal OSA to switch to interactive mode. This is accomplished by sending a Modify QID Request assist signal to the adapter. Modify QID carries a flag to indicate the type of modify (toggle off).

When the adapter receives a toggle off Modify request, it performs the following, in one example:
1. Updates the QID state to "Assigned";
2. Immediately presents (flushes) any queued LR data (if any) for that connection to the stack, bypassing the generation of any outbound flows (ACK or Window Update) on the connection (the stack will handle all the outbound flows during interactive mode). Interactive mode will persist until a Receive-type operation with MSG_WAITALL is set.
3. Sends all subsequent inbound packets via the normal inbound queue 0 (using non LR processing).

Generally, the communication pipe between the two end points will be drained before the transition from streaming to interactive occurs. It is therefore unlikely that any data will be queued in LR SBALs at the point of streaming-to-interactive transition. Even though it is unlikely that any data is queued data at this point, a transition code is implemented such that any queued data is immediately presented to the stack when the signal is processed.

Figure 14A:
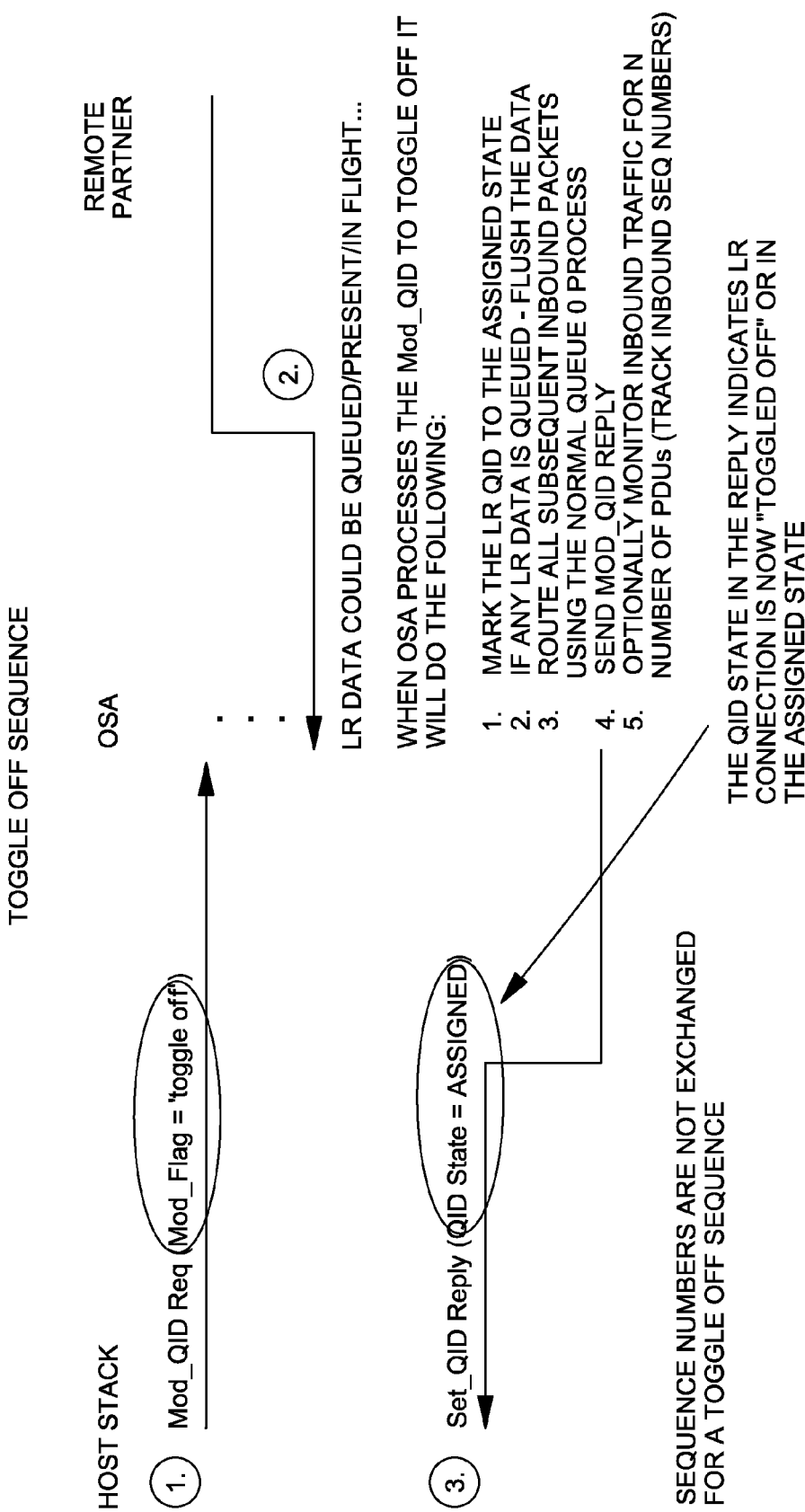
FIG. 14A depicts one embodiment of the logic for a toggle off sequence, in accordance with an aspect of the present invention.

An example of the toggle off sequence is described with reference to FIG. 14A. The host stack recognizes a socket API event that causes the connection to toggle out of streaming mode, such as a Send or a Receive (without Msg_WAITALL option) (#1). This causes the host stack to start the toggle-off sequence, which results in a Mod_QID (with a modify flag set to toggle off).

When OSA receives the Mod_QID (#2), it performs the following, in one example:
a. Updates the QID state to the Assigned state;
b. Flushes any (LR) data if currently queued in an LR SBAL;
c. Routes subsequent inbound packets using the normal queue 0 processing;
d. Builds and sends mod-QID reply (#3) indicating the toggle was successful (state updated); and
e. Optionally, continues to track (monitor) the next N number of inbound packets saving the highest received inbound sequence number (in anticipation of the next toggle on sequence).

When the host stack receives the Mod_QID reply, it updates its status information confirming the toggle off sequence. The host stack is now responsible for processing all inbound data (both the flushed LR data and/or normal queue 0 data).

Toggle On Sequence

When another Receive with MSG_WAITALL is processed in the socket API, a new Modify QID request signal is sent to the adapter to initiate the toggle on sequence. The Modify QID will carry the following information, as examples:
1. Flags which indicate the type of toggle sequence (On);
2. The new ReadSize value (matching the application's current requested receive size);
3. Sequence numbers:
    a. The current host inbound sequence number;
    b. The connection inbound sequence numbers; and
    c. The outbound sequence number.

When the adapter receives the toggle on Modify request, it performs the following, as one example:
1. Updates the QID state to "Pending Active";
2. Finds (resolves) the next inbound sequence number (either via monitoring the connection or now waiting for the next inbound packet);
3. In response to step two completing . . .
    a. If the inbound sequence number found matches the host request then:
        i. Transition the QID to the Active state;
        ii. Convert to LR mode (all inbound data sent via LR queues);
    b. If the inbound sequence number found does not match the host request, then:
        i. Leave the QID in the Pending Active state;
        ii. Begin queuing all data in the LR buffers (do not mark complete);
        iii. Build or track Acks, but do not send to remote partner.

It is possible that the connection will resume streaming data before the receive socket API learns that the connection has reverted back into streaming mode. This is resolved by the four way hand shake, which allows the host and the OSA to synchronize sequence numbers.

Figure 14B:
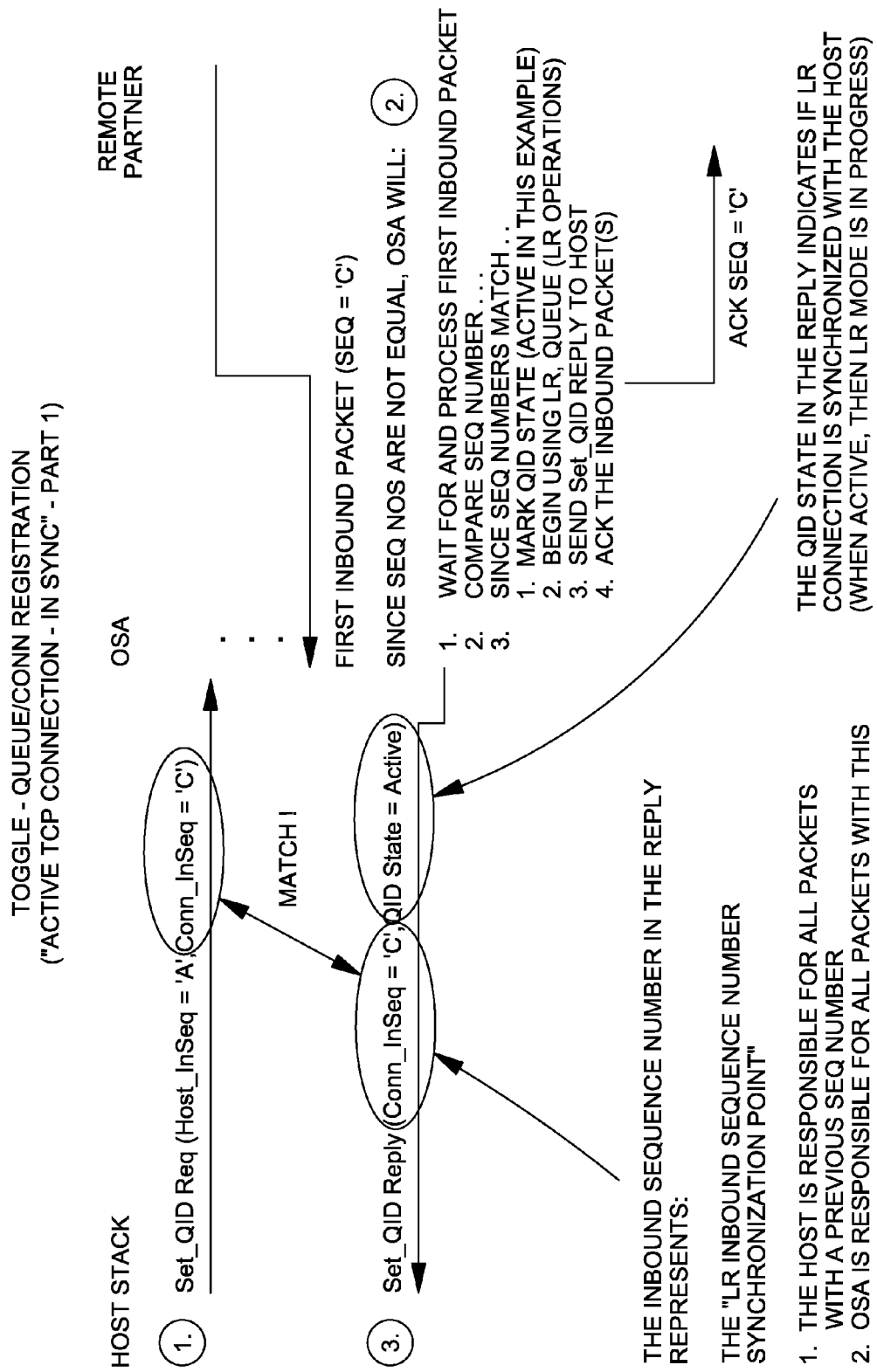
FIGS. 14B-14C depict one embodiment of the logic for a toggle on sequence with in-sync sequence numbers, in accordance with an aspect of the present invention.
Figure 14C:
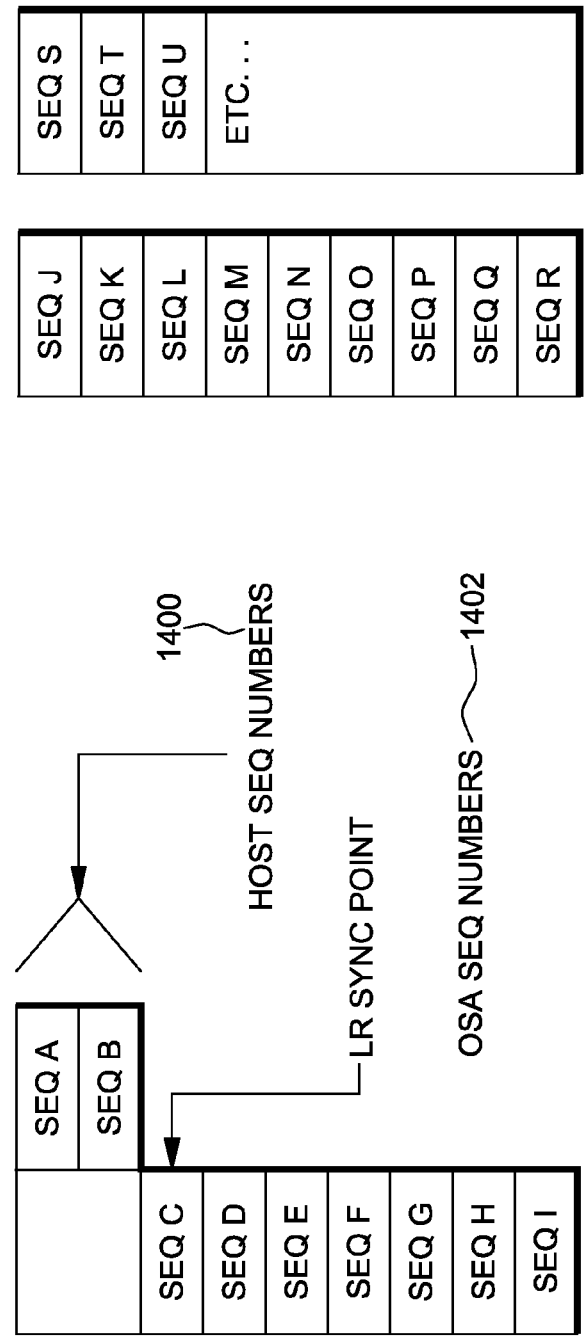
Figure 14D:
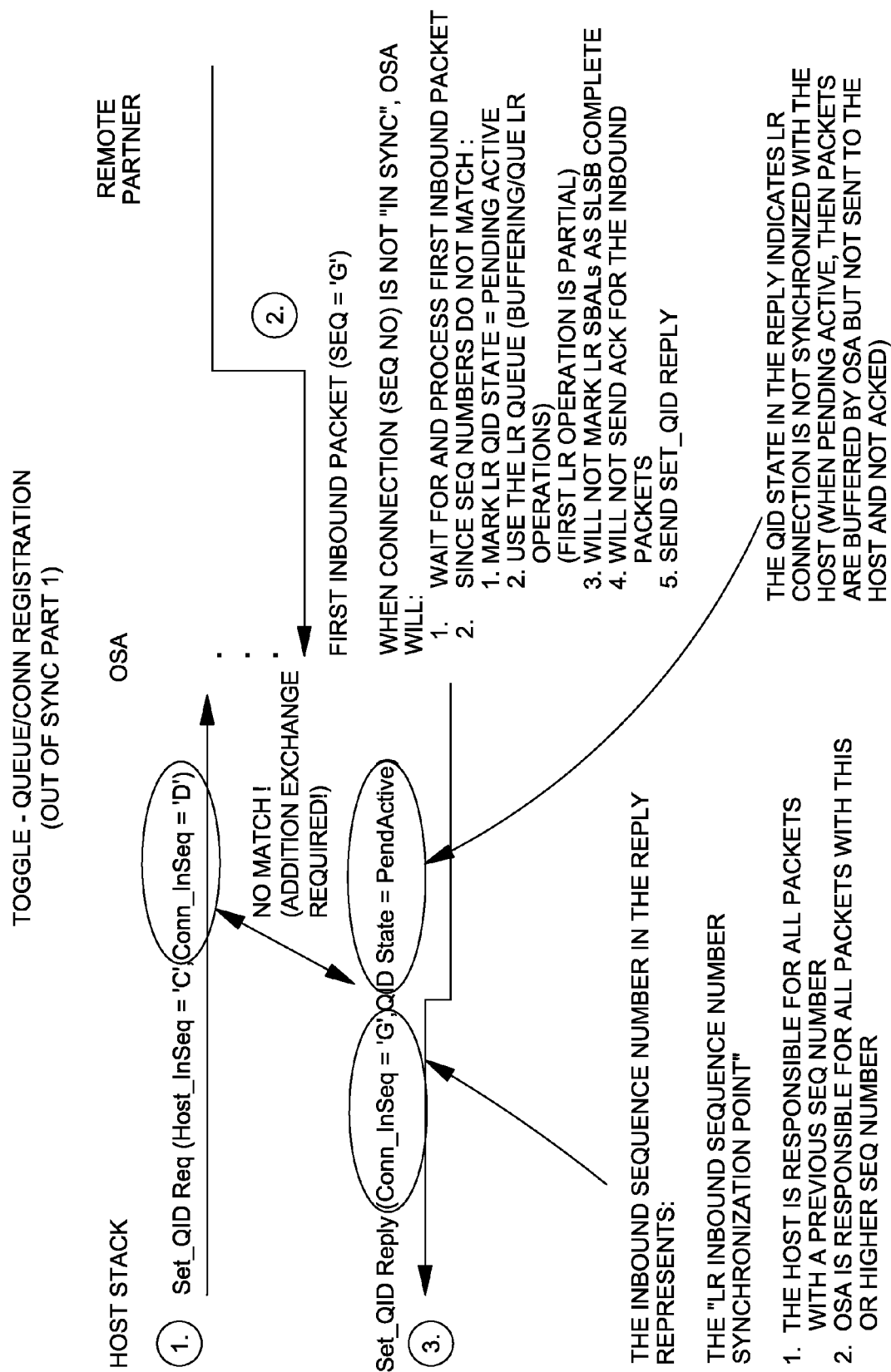
FIGS. 14D-14F depict one embodiment of the logic for a toggle on sequence with out-of-sync sequence numbers, in accordance with an aspect of the present invention.
Figure 14E:
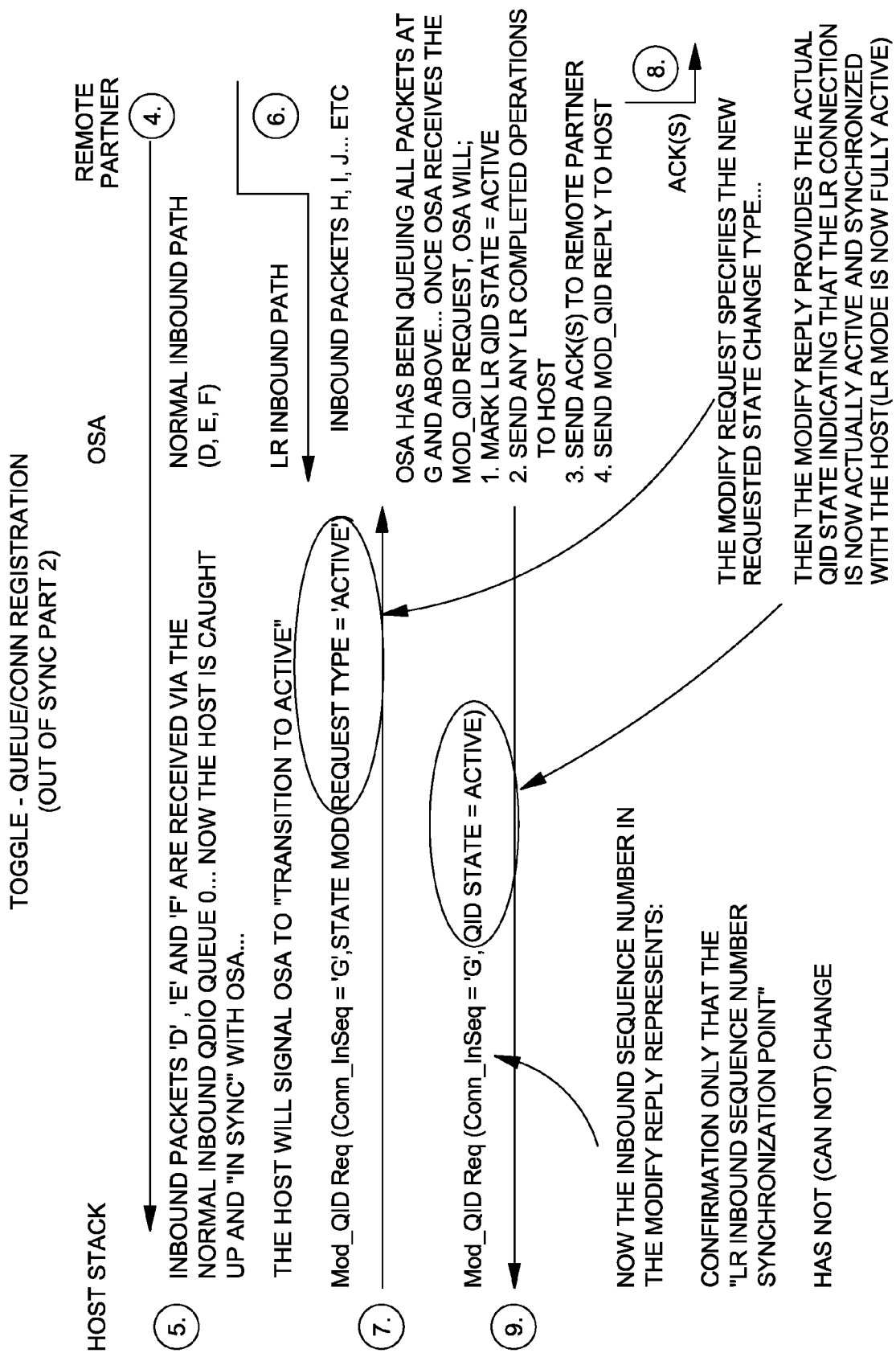
Figure 14F:
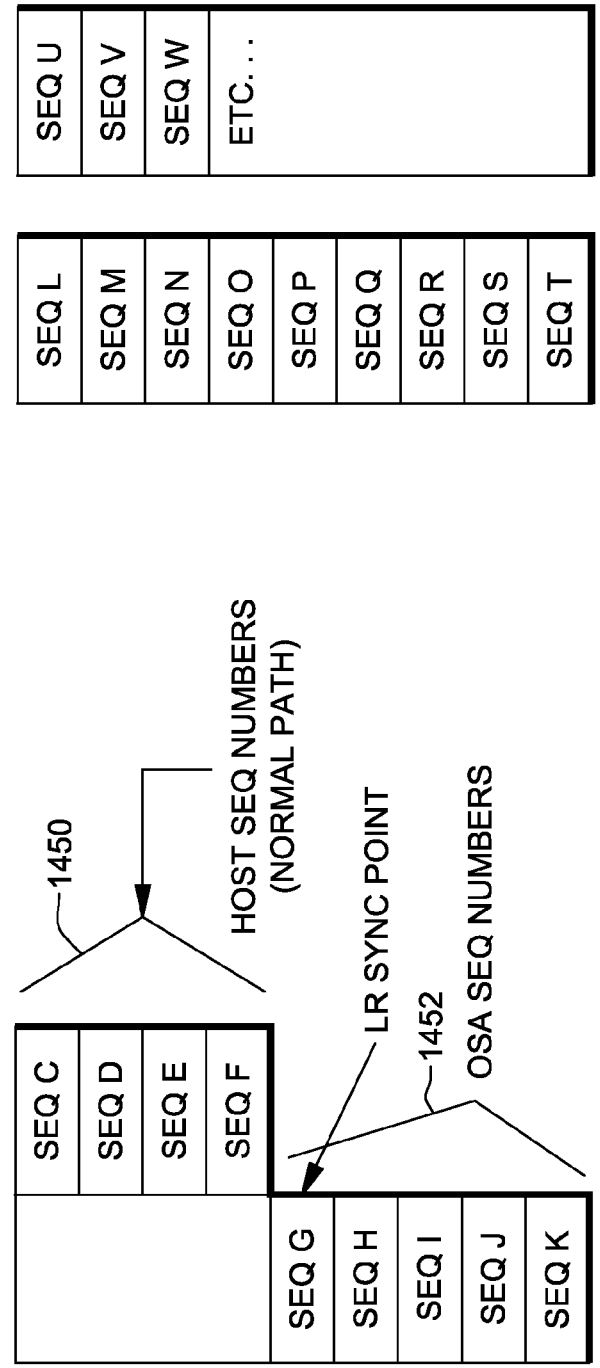

An example of the toggle on sequence is depicted in FIGS. 14B-14F. Specifically, FIGS. 14B-14C depict one example of a toggle on sequence, in sync; and FIGS. 14D-14F depict an example of a toggle on sequence, out-of-sync.

Referring initially to FIG. 14B, the host sends Set_QID (or Mod_QID for a "toggle on" sequence) (#1). Now the inbound sequence numbers sent by the host on the request do not match. When the connection inbound sequence number is set to a higher value than the host inbound sequence number this indicates that the host stack believes data is in flight (active connection, inbound data already streaming, and the host has already queued some sequence numbers). For this case, OSA is to first find (or already have been monitoring) the next inbound sequence number before replying to the primitive.

OSA now receives sequence number C, which matches the next expected inbound sequence number (#2). OSA then transitions into the LR Active state and sends the host the positive Set_QID reply. All data (starting at sequence number C) is now being processed in the LR mode.

The host stack receives the positive Set_QID reply (#3). It discovers that the inbound sequence numbers did match and that the connection is now in the Active state. The host prepares to process the LR data (starting at sequence number C). It should be noted that the host stack could receive LR data prior to receiving the Set_QID reply (they occur asynchronously to each other), and is to be prepared to receive the LR data as soon as the request is sent to OSA.

FIG. 14C illustrates that the host is to be responsible for the first two sequence numbers (A and B) 1400, and OSA is to align the first LR operation as a partial operation (account for the packets already received by the host for the first LR operation) 1402.

Referring to FIGS. 14D-14F, a toggle on, out-of-sync operation is described. Referring initially to FIG. 14D:

1. The Host stack sends either:
  a. Set_QID to register a new TCP connection and new LR Queue (QID), or . . .
  b. Mod_QID for an existing QID (TCP connection) to request a state change. The Mod_QID flags indicate this is a "Stage 1 Modify", which means this is a request to start the transition to the "Active State" (i.e., to initiate the "toggle on sequence" for an already registered QID, "try to go Active").

In either case, in this example, the inbound sequence numbers sent from the host in the request (Set or Mod) are not equal. This indicates that the host already has some inbound data queued at the TCP receive layer, and knows data is in flight. This means OSA is to resolve (find) the first inbound sequence number before replying to the Set_QID/Mod_QID. Alternatively, OSA could have already been actively "monitoring" the connection—saving the highest inbound sequence number, in which case it can reply immediately.

2. In this example, the first inbound sequence number processed (found) by OSA is greater than the sequence number sent by the host, which is sequence number 'G'. Since this sequence number is not equal to the next expected inbound sequence number sent in the request, OSA will (using the 4 way handshake sequence):
  a. Place the QID in the Pending Active State;
  b. Move the inbound packet (and any subsequent packets with a higher sequence number) into the LR buffer accounting for the first LR buffer as a partial buffer;
  c. Refrain from parking any SBALs as complete (do not present data to the host);
  d. Refrain from sending any Acks to the remote partner; and
  e. Send Set_QID (Mod_QID) positive Reply to the host—with state=Pending Active, and Inbound Sequence=G.

3. The host stack receives the Set_QID (Mod_QID) Reply, and detects:
  a. That the sequence numbers did not match;
  b. The QID state is Pending Active;
  c. The host is responsible for the processing of the missing sequence numbers (in this example the gap is D, E, and F, which will be received over the normal input queue).

4 (FIG. 14E). Meanwhile, the inbound stream is still arriving from the remote partner. OSA will send packets D, E, and F via the normal QDIO input queue, taking the normal (non-LR) path into the host.

5. The host stack receives the missing packets, D, E, and F. The host stack detects that it is now in sync (caught up) with the OSA sync transition point (G). It will trigger (schedule) the next primitive to be sent to OSA.

6. During this time period the remote partner is still streaming inbound data. Packets with a higher sequence number than G are being buffered (queued) in the LR buffer. Again, no Acks and no SBALs are completed (the data is held in LR buffers).

7. Steps 5, 6, and 7 are logically all occurring at the same time. The host now sends the next primitive Mod_QID (request state change=Active) to signal OSA to transition to the state to Active.

8. OSA receives and processes the Mod_QID (Stage 2) and will:
  a. Mark the QID state as Active;
  b. Send any owed Acks to the remote partner;
  c. Mark any full LR SBALs to the host; and
  d. Send the Mod_QID positive Reply to the host with the updated state of Active State.

9. The host receives the Mod_QID positive reply and transitions into LR mode processing for this connection (toggle sequence is now complete).

Referring to FIG. 14F, the host TCP receive processing is to assemble the first partial LR buffer from OSA. The host is to complete the first (LR) operation using packets with sequence number C, D, E, and F 1450 (received via the normal inbound path) along with the remaining sequence numbers (G thru K) 1452 within the first partial LR buffer. All subsequent LR operations should be full LR buffers.

In one example, the QDIO input queues used for the large receive function support QID states. The states are applicable to the individual QIDs. The states are directly controlled by the shared network interface and indirectly controlled by the host stack via the set, modify and delete QID primitives. The states are transferred back to the host in the primitive replies.

As examples, the following large receive QID states are defined:
  1) Inactive State—The QID is not assigned and not currently in use.
  2) Pending Active State—The QID is assigned, but the host/shared network interface synchronization is still in progress. An attempt was made to register and activate the QID (via Set_QID or Mod_QID ("toggle on sequence")), however an additional primitive (handshake) is required (pending). The TCP connection inbound sequence number found by OSA was different (higher) than the next expected inbound sequence number passed in the Set or Mod request primitive from the host (i.e., inbound traffic was already in progress during the processing of the Set/Mod primitive). When the QID is in this state:
    a. Shared network interface and the host stack are not yet synchronized with inbound sequence numbers;
    b. Shared network interface will buffer packets into the LR buffers, but will not send the inbound buffered data to the host (data is being queued into the LR SBAL buffers);
    c. Shared network interface is tracking the received inbound sequence numbers that have been buffered, but the shared network interface will not send acknowledgments to the remote partner for any inbound packets while in this state. Shared network interface is waiting for connection synchronization confirmation from the host stack to complete (i.e., a Mod_QID to the Active state).

3. Active State—The QID is assigned and active and shared network interface is actively using the LR queue ("mode") for inbound data for this TCP connection. This is also referred to as the "toggled on" state.

4. Assigned State—The QID is assigned to a TCP connection, but the shared network interface is routing all inbound packets using the normal input queue 0 processing (i.e., host is performing receive processing). In the assigned state, the shared network interface will only save the QID and TCP relationship. No additional processing for this connection or QID is required by OSA while in this state (i.e., for inbound packets for this connection).

This state is used to accommodate the "toggled off" connection for applications that use a single TCP connection for both streaming and exchanging "control information/data". The QID remains assigned in anticipation that the host application will "toggle on" again (possibly frequent toggling on/off between each file transfer).

Described in detail above is a capability for directly placing data in host memory without interrupting the host until a specific defined point has been reached (e.g., a certain amount of data has been received, as defined by LR size). Instead, the shared network interface handles this processing. This saves time in CPU cycles and network I/O. Further, this processing is performed without changing any host applications.

In particular, in one example, a direct memory access is provided between a host OS and a shared network interface to directly place inbound data packets received at the shared network interface in a user application buffer area. The incoming data packets are split so the protocol and transport headers are separated from the data. The split out data is packed contiguously in the user application buffer to allow for the reception of large data segments needed for certain applications. The data is presented in the proper order to the host OS protocol stack. For the host O/S protocol stack to properly process the incoming data, the host OS has the capability to associate the received data with the proper split protocol and transport headers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 15:
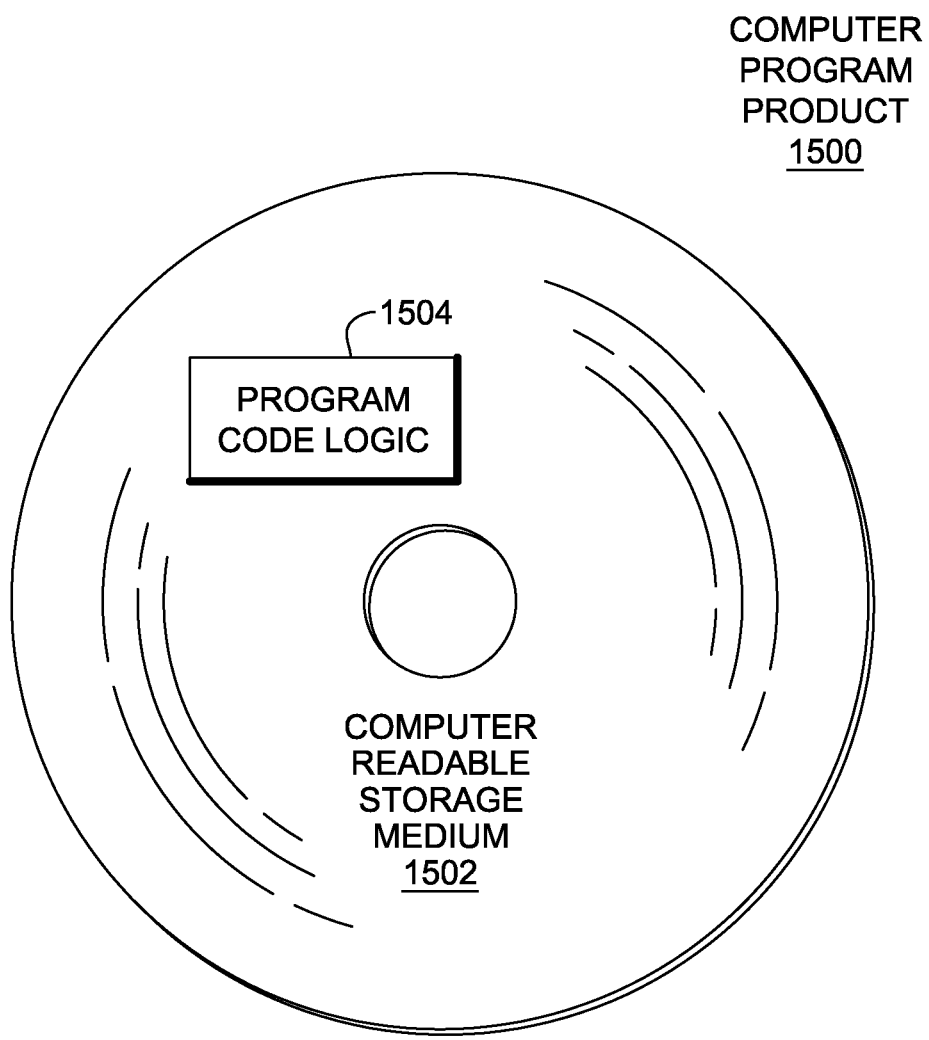
FIG. 15 depicts one embodiment of a computer program product incorporating one or more aspects of the present invention.

Referring now to FIG. 15, in one example, a computer program product 1500 includes, for instance, one or more computer readable storage media 1502 to store computer readable program code means or logic 1504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, the environment need not be partitioned. Additionally, data structures, other than QDIO data structures, may be used, and the QDIO structures may be different than the examples described herein. Further, the requests/replies may include more, less or different information. Moreover, protocols other than TCP, such as UDP and others, may benefit from one or more aspects of the present invention, and the shared network interface can be other than OSA. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing incoming data of a computing environment, the computer program product comprising:

a non-transitory computer readable storage medium readable by a processing circuit and storing instructions for execution by the processing circuit for performing a method comprising:

receiving, by a shared network interface of the computing environment from a host of the computing environment, a specification of an amount of data to be received by the shared network interface and provided to memory of the host as the data is received absent notifying the host of receipt of the specified amount of data until the specified amount of data has been provided to the host;

receiving data by the shared network interface, the received data comprising at least a portion of the specified amount of data to be provided to the host of the computing environment;

determining, based on receiving the data, whether receive processing associated with the received data is to be performed by the shared network interface or by the host;

performing the receive processing by the shared network interface, based on the determining indicating that the shared network interface is to perform the receive processing, wherein the host is relieved of performing the receive processing and wherein performing the receive processing comprises placing the received data into the host memory as the data is received and absent notification to the host that the received data was placed into the host memory until the specified amount of data has been provided to the host; and based on performing receive processing for the specified amount of data, notifying the host of provision of the specified amount of data.

2. The computer program product of claim 1, wherein receiving the data comprises receiving a data packet, and wherein the receive processing comprises:

separating a header portion of the data packet from a data portion of the data packet;

storing the header portion in one part of a data object; and storing the data portion in another part of the data object, wherein the data object is located in memory of the host.

3. The computer program product of claim 2, wherein the method further comprises:

determining whether the data object is to be presented to the host; and presenting the data object to the host, based on determining the data object is to be presented to the host.

4. The computer program product of claim 3, wherein the determining whether the data object is to be presented comprises checking whether the specified amount of data has been provided to the host, and wherein the presenting the data object notifies the host of provision of the specified amount of data.

5. The computer program product of claim 3, wherein the method further comprises repeating the separating, the storing the header portion, and the storing the data portion for at least one other data packet, based on determining the data object is not to be presented to the host.

6. The computer program product of claim 3, wherein the presenting comprises interrupting the host to indicate the data object has been stored in memory of the host.

7. The computer program product of claim 6, wherein the indication is in a status block associated with the data object.

8. The computer program product of claim 2, wherein the data object is a buffer of a queue, and said method further comprises using a control structure of the queue to specify the one part to store the header portion and the another part to store the data portion.

9. The computer program product of claim 1, wherein the determining comprises checking whether the received data is received on a connection registered with the shared network interface as participating in the receive processing, wherein the shared network interface is to perform the receive processing, based on the received data being received on the registered connection.

10. The computer program product of claim 9, wherein the method further comprises registering the connection, wherein the registering comprises assigning a particular data object to the connection, the data object to directly store the received data.

11. The computer program product of claim 10, wherein the method further comprises deregistering the connection, based on an indication that the connection is no longer to be registered.

12. The computer program product of claim 10, wherein the method further comprises modifying the registered connection, wherein during the receive processing a change is made to have the receive processing performed by the host and not by the shared network interface.

13. The computer program product of claim 1, wherein the method further comprises providing from the shared network interface to a sender of the data an acknowledgment of receipt of the data.

14. A computer system for managing incoming data of a computing environment, the computer system comprising:

a memory; and a processor in communications with the memory, wherein the computer system is configured to perform a method, said method comprising:

receiving, by a shared network interface of the computing environment from a host of the computing environment, a specification of an amount of data to be received by the shared network interface and provided to memory of the host as the data is received; absent notifying the host of receipt of the specified amount of data until the specified amount of data has been provided to the host;

receiving data by the shared network interface, the received data comprising at least a portion of the specified amount of data to be provided to the host of the computing environment;

determining, based on receiving the data, whether receive processing associated with the received data is to be performed by the shared network interface or by the host;

performing the receive processing by the shared network interface, based on the determining indicating that the shared network interface is to perform the receive processing, wherein the host is relieved of performing the receive processing and wherein performing the receive processing comprises placing the received data into the host memory as the data is received and absent notification to the host that the received data was placed into the host memory until the specified amount of data has been provided to the host; and based on performing receive processing for the specified amount of data, notifying the host of provision of the specified amount of data.

15. The computer system of claim 14, wherein receiving the data comprises receiving a data packet, and wherein the receive processing comprises:

separating a header portion of the data packet from a data portion of the data packet;

storing the header portion in one part of a data object; and storing the data portion in another part of the data object, wherein the data object is located in memory of the host.

16. The computer system of claim 15, wherein the method further comprises:

determining whether the data object is to be presented to the host; and presenting the data object to the host, based on determining the data object is to be presented to the host.

17. The computer system of claim 14, wherein the determining comprises checking whether the received data is received on a connection registered with the shared network interface as participating in the receive processing, wherein the shared network interface is to perform the receive processing, based on the data being received on the registered connection; and wherein the method further comprises:

modifying the registered connection, wherein during the receive processing a change is made to have the receive processing performed by the host and not by the shared network interface.

18. A method of managing incoming data of a computing environment, said method comprising:

receiving, by a shared network interface of the computing environment from a host of the computing environment, a specification of an amount of data to be received by the shared network interface and provided to memory of the host as the data is received absent notifying the host of receipt of the specified amount of data until the specified amount of data has been provided to the host;

receiving data by the shared network interface, the received data comprising at least a portion of the specified amount of data to be provided to the host of the computing environment;

determining, based on receiving the data, whether receive processing associated with the received data is to be performed by the shared network interface or by the host;

performing the receive processing by the shared network interface, based on the determining indicating that the shared network interface is to perform the receive processing, wherein the host is relieved of performing the receive processing and wherein performing the receive processing comprises placing the received data into the host memory as the data is received and absent notification to the host that the received data was placed into the host memory until the specified amount of data has been provided to the host; and based on performing receive processing for the specified amount of data, notifying the host of provision of the specified amount of data.

19. The method of claim 18, wherein receiving the data comprises receiving a data packet, and wherein the receive processing comprises:

separating a header portion of the data packet from a data portion of the data packet;

storing the header portion in one part of a data object; and storing the data portion in another part of the data object, wherein the data object is located in memory of the host.

20. The method of claim 18, further comprising providing from the shared network interface to a sender of the data an acknowledgment of receipt of the data.

* * * * *